US006991193B2

(12) United States Patent
Kurokawa et al.

(10) Patent No.: US 6,991,193 B2
(45) Date of Patent: Jan. 31, 2006

(54) TAPE DRIVE DEVICE, TAPE EXTRACTION DEVICE AND TAPE CASSETTE

(75) Inventors: Toshiya Kurokawa, Tokyo (JP); Joichi Daiba, Tokyo (JP); Katsumi Maekawa, Tokyo (JP); Yasuaki Kano, Tokyo (JP); Atsushi Mitani, Tokyo (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 10/181,308

(22) PCT Filed: Nov. 13, 2001

(86) PCT No.: PCT/JP01/09920

§ 371 (c)(1),
(2), (4) Date: Apr. 11, 2003

(87) PCT Pub. No.: WO02/39445

PCT Pub. Date: May 16, 2002

(65) Prior Publication Data

US 2003/0168542 A1    Sep. 11, 2003

(30) Foreign Application Priority Data

| Nov. 13, 2000 | (JP) | ............................ 2000-345956 |
| Feb. 6, 2001 | (JP) | ............................ 2001-030116 |
| Feb. 6, 2001 | (JP) | ............................ 2001-030117 |

(51) Int. Cl.
*G11B 15/67* (2006.01)

(52) U.S. Cl. ................. 242/332.4; 242/332.8

(58) Field of Classification Search ............ 242/332.4, 242/332.8
See application file for complete search history.

(56) References Cited

U.S. PATENT DOCUMENTS

| 4,793,569 | A | * | 12/1988 | Ohsaki ..................... 242/332.4 |
| 5,219,129 | A | * | 6/1993 | Spicer et al. ............. 242/332.4 |
| 5,465,187 | A | | 11/1995 | Hoge et al. ................. 360/132 |
| 5,816,519 | A | * | 10/1998 | Jacobs et al. ............ 242/332.4 |
| 6,378,796 | B1 | * | 4/2002 | Hamming et al. ....... 242/332.4 |

FOREIGN PATENT DOCUMENTS

| DE | 693 21 805 T2 | 3/1994 |
| EP | 0 589 443 A2 | 3/1994 |
| JP | 63-193234 | 12/1988 |
| JP | 03-41681 | 2/1991 |
| JP | 06-195933 | 7/1994 |
| JP | 08-195004 | 7/1996 |

* cited by examiner

*Primary Examiner*—Kathy Matecki
*Assistant Examiner*—Scott Haugland
(74) *Attorney, Agent, or Firm*—Sonnenschein, Nath & Rosenthal LLP

(57) ABSTRACT

A tape drive apparatus, tape extraction apparatus and tape cartridge that enable a reliable chucking and chucking release, and a stable carrying of a tape being extracted from a cartridge. The apparatus includes a carrying mechanism for extracting the tape as a recording medium from the cartridge where the magnetic tape is stored, and for carrying the magnetic tape to be wound up onto a takeup reel provided on the drive apparatus.

3 Claims, 22 Drawing Sheets

TAPE DRIVE DEVICE, TAPE EXTRACTION DEVICE AND TAPE CASSETTE

TECHNICAL FIELD

The present invention relates to a tape drive apparatus, tape extraction apparatus and tape cartridge, in which a magnetic tape being used as a recording medium is extracted from a tape cartridge and carried to be wound onto a takeup reel provided within a drive unit such that information is recorded and/or reproduced on the magnetic tape.

BACKGROUND OF THE INVENTION

The tape drive apparatus that uses a single reel tape cartridge has been in existence. While the existing single reel tape cartridge may be small and convenient for the user to handle or carry it, the cartridge requires, when mounted on the tape drive apparatus, that the tape be extracted from its cartridge and wound onto a takeup reel which is provided within the drive unit.

To meet the requirements, the existing tape drive apparatus comprises a takeup reel having a leader tape within the drive unit. The leader tape comprises a hook at its end. On the other hand, the magnetic tape stored in the tape cartridge comprises a hole to be hooked at its end. When the tape cartridge is mounted on the tape drive to load the tape, the takeup real is actuated, and the end of the leader tape moves through a guide groove provided in the drive unit until the end of the leader tape protrudes from the end of the groove, where the hook at the end of the leader tape vertically faces the hook hole at the end the magnetic tape held immediately above the leader tape. With the hook and hole in this relationship, a hammer provided at the end of the guide groove kicks the end of the leader tape upward, causing the hook hole at the end of the magnetic tape to engage the hook at the end of the leader tape. Subsequently, the takeup reel rotates to wind the leader tape, thereby extracting the magnetic tape from the tape cartridge.

The above-described tape drive apparatus is conventionally constituted such that, the end of the leader tape attached to the takeup reel in the drive unit moves through the guide groove to meet the magnetic tape and hook it to be connected, in order to extract the magnetic tape from the tape cartridge. However, the leader tape, being a flexible resin film, cannot move smoothly and stably to fetch the magnetic tape, and the leader tape also shakes as its hook end vertically faces the hook hole of the end of the magnetic tape, rendering the mutually facing relationship between the hook and hole unstable, and frequently resulting in errors in engaging. On an error in engaging, no second attempt is available, and the tape cartridge must be removed once and remounted at the expense of time and effort.

A human contact or other forms of mechanical shock given to the drive apparatus while carrying the leader tape to the takeup reel may cause the ends of the leader tape and the magnetic tape to unhook from each other.

SUMMARY OF THE INVENTION

The present invention has been made in the light of the aforementioned problems. The object of the invention is to offer a tape drive apparatus, tape extraction apparatus and tape cartridge that allow a tape to be extracted from its cartridge, to be carried and wound up onto a takeup reel stably and reliably, and that detect a chucking error and breakage of the tape during the extraction and carrying; and enable another attempt at chucking operation to be conducted.

The invention according to one embodiment is a tape drive apparatus which comprises a carrying mechanism for extracting a tape used as a recording medium from a cartridge that stores the tape, and for carrying the tape to be wound onto a takeup reel provided in a drive unit, in which information is recorded and/or reproduced onto the tape that is extracted from the cartridge. Specifically, the tape drive apparatus comprises the carrying mechanism comprising a carrying section provided at the end of the tape for engaging a leader block, and for carrying the engaged leader block between the cartridge and the takeup reel, and a chucking mechanism that engages or release engagement with the leader block in conjunction with the movement of the carrying section.

On extracting the magnetic tape out of its cartridge, the tape is carried to the takeup reel in the drive unit stably and reliably by the carrying section, after the chucking mechanism, provided in the carrying mechanism for carrying the tape, engaging the leader block, provided at the end of the magnetic tape, and then the tape is transferred to the takeup reel by engaging the leader block onto a designated point on the takeup reel, as a result the tape is reliably wound onto the takeup reel as the leader block is released the engagement from the chucking mechanism.

The carrying section of the carrying mechanism may cause the chucking mechanism to move along a cam groove disposed between the cartridge mount end and the takeup reel.

The chucking mechanism in the carrying mechanism, which carries the leader block of the magnetic tape, may allow a stable and reliable move of the leader block between the cartridge mounting side and the takeup reel.

The chucking mechanism may comprise a chucking pin that is normally forced in the direction of being engaged with the leader block and is pressed by release levers disposed on the cartridge mounting side and the takeup reel side to release chucking.

Since the chucking pin, which is engaged with the leader block, is normally forced in the direction of being engaged with the leader block, the chucking pin is able to be reliably engaged to hold the leader block, and carry the leader block stably and reliably; and is also able to reliably release the leader block on the cartridge mounting side and the takeup reel side by the releasing lever.

The action of chucking and the release of chucking of the chucking mechanism may be effected by a cam mechanism to engage with, and release engagement with the leader block in coordination with the move of the carrying section.

Since the action of the chucking mechanism is conducted by the use of a cam mechanism, it is possible to make the action of chucking and the release of chucking simple, stable and reliable.

The invention according to another embodiment is a tape drive apparatus, comprising a tape carrying mechanism for extracting a magnetic tape, used as a recording medium, from the cartridge where the tape is stored; and for carrying the magnetic tape to be wound up onto a takeup reel provided in the drive unit, in which information is recorded and/or reproduced onto the magnetic tape extracted from the cartridge. The carrying mechanism comprises: a carrying section for engaging a leader block provided at the end of the magnetic tape to carry the leader block between the cartridge and the takeup reel; a detection means for detecting the status of engaging the leader block on the carrying mechanism; and a control means for controlling the carrying section to re-attempt to engage with the leader block according to the detected result of the detection means.

The control means controls the carrying section to re-attempt to engage the leader block depending on the detected result of the status of engaging between the leader block provided at the end of the tape stored in the cartridge and the carrying section of the carrying mechanism which carries the tape, thereby ensuring engaging between the leader block and carrying section. As a result, stable and reliable carrying of the tape between the cartridge and takeup reel is conducted.

The detection means may be constituted by a chucking sensor that detects the status of the leader block being chucked by the chucking mechanism.

Since the chucking status of the chucking mechanism for the leader block is detected by the chucking sensor, chucking the leader block is reliably conducted.

A takeup reel and a tape reel of the cartridge may be driven by the respective reel motors comprising frequency generators respectively; and outputs of the frequency generators may be detected either as normal or not normal to verify the carrying status of a magnetic tape.

Since the tape drive apparatus comprises frequency generators in the reel motors that drive the takeup reel and the tape reel of the cartridge to verify the carrying status of the magnetic tape by detecting the outputs from the frequency generators, the carrying status of a magnetic tape is verified quickly and reliably.

The invention according to yet another embodiment is a tape extraction apparatus, comprising: a cartridge mount mechanism for mounting a tape cartridge with a magnetic tape wound thereon; a takeup mechanism for winding up a magnetic tape extracted from the tape cartridge; and a carrying mechanism. The carrying mechanism includes: a tape extraction member having a press section forced in the direction of engaging the leader block with an unlocking prevention piece formed protruding externally thereon for preventing the releasing of the engagement with the leader block provided on the magnetic tape, in which engaging the leader block is released by pressing down the press section; a guide shaft that guides the move of the move mechanism disposed between the cartridge mount mechanism and the takeup reel; and a guide plate disposed along the carrying path of the tape extraction member, and the carrying mechanism carries the tape extraction member with the leader block engaged thereto. In the above described tape extraction apparatus, the tape extraction member carries the tape by extending the unlocking prevention piece over the guide plate formed into a protrusion.

The tape extraction member guided by a guide groove is carried with the unlocking prevention piece formed on the press section extending over a guide plate formed as a protrusion over the guide groove. Therefore, in the tape extraction member, the guide plate prevents the unlocking prevention member provided in the press section from pressing down, when the tape extraction member carries the leader block with the magnetic tape clamped thereon, even though such impact as being touched by the user is given, thereby preventing releasing the engagement with the leader block occurred by pressing the press section.

The invention according to a further embodiment is a tape extraction apparatus, comprising: a takeup mechanism that winds up a tape extraction member having a engaging shaft with a flange disposed on one end for being engaged by a engaging section of the leader block disposed on one end of the magnetic tape and the magnetic tape extracted by the tape extraction member; a carrying mechanism that carries the tape extraction member between a cartridge mounted at a cartridge mount section and the takeup mechanism, in which a chamfered section engaging the rotation restriction section disposed on the engaging section of the leader block is provided on the flange section formed on a engaging shaft of the extraction member.

The disposition of the chamfered section that engages with the rotation restriction section of the engaging section of the leader block at one end of the magnetic tape in the flange of the engaging shaft of the tape extraction member, enables the engaging shaft to be inserted into the engaging section of the leader block, allowing the chamfered section of the flange section of the engaging shaft to butt against the rotation restriction section of the internal perimeter of the engaging section of the leader block to engage. Accordingly, the position of the leader block for engaging with the tape extraction mechanism is determined, thereby preventing the rotation or rattling of the leader block while being carried.

The invention according to yet a further embodiment is a tape cartridge, comprising: a leader block provided at one end of a magnetic tape; a tape reel that winds up the magnetic tape with the leader block provided at one end; and a body of the cartridge unit that rotatably stores the tape reel having an opening that exposes part of the leader block externally, in which the leader block comprising: a engaging section thereon to which a engaging shaft of the tape extraction member is engaged; and a rotation restriction section, which restricts the rotation of the leader block with respect to the engaging shaft, disposed on at least one end of the engaging section.

The leader block disposed at one end of the magnetic tape comprises the engaging section, to which the engaging shaft of the tape extraction member is engaged, and a rotation restriction section that prevents the rotation of the engaging shaft is formed on the engaging section, allowing the position of the leader block for engaging with the tape extraction mechanism to be determined at the time of engaging with the tape extraction mechanism, thereby preventing the rotation or rattling of the leader block to extract the magnetic tape from the body of the cartridge stably and smoothly.

The leader block may comprise a positioning groove disposed thereon for guiding the insertion thereof into the cartridge unit, and also for positioning thereof.

The disposition of the positioning groove on the leader block, which also functions as a guide for the insertion of the leader block into a cartridge unit, allows the leader block to be smoothly inserted, and also reliably positioned to be held at a designated position in the cartridge unit.

The leader block may comprise a positioning groove disposed thereon for guiding the insertion thereof into the takeup reel, and also for positioning thereof.

The disposition on the leader block of the positioning groove, which also functions as the guide for the insertion of the leader block into a takeup reel, allows the leader block to be smoothly inserted and also reliably positioned to be held at a designated position on the takeup reel.

The leader block may comprise an engaging depression section disposed thereon to be engaged with an engaging protrusion section disposed on a leader block press piece of the tape cartridge.

When the leader block is inserted into the tape cartridge, the engaging protrusion section of the press piece on the tape cartridge is engaged with the engaging depression section of the leader block, thereby holding the leader block stably and reliably in the cartridge.

The leader block may comprise an engaging depression section disposed thereon to be engaged with an engaging protrusion section disposed on the takeup reel.

When the leader block is inserted into the takeup reel, the engaging protrusion section of the takeup reel is engaged with the engaging depression section of the leader block, thereby holding the leader block stably and reliably on the takeup reel.

DETAILED DESCRIPTION OF THE PRESENTLY PREFERRED EMBODIMENTS

Hereinafter, an embodiment of the present invention will be described with reference to the drawings.

Figure 1:
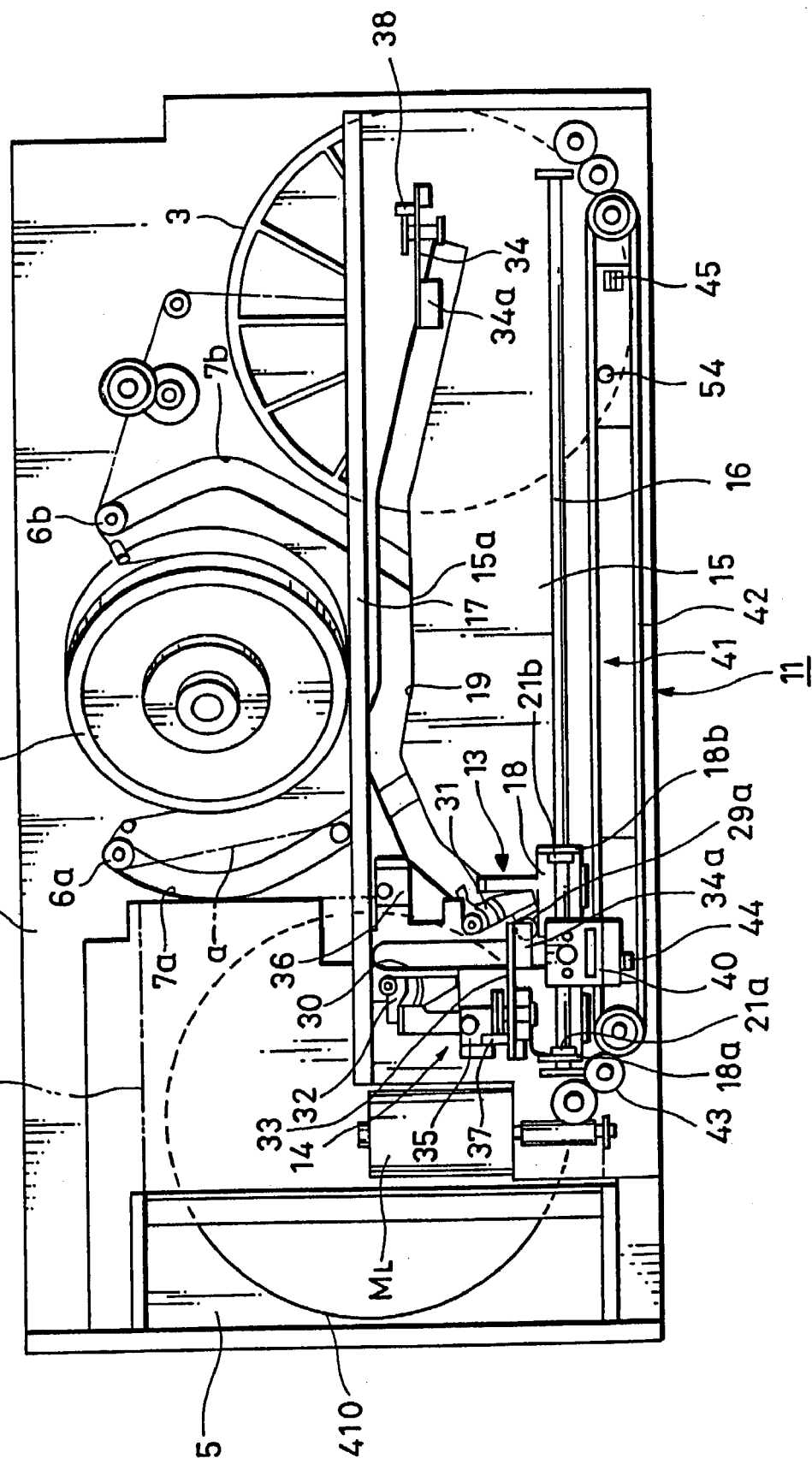
FIG. 1 is a partly omitted plan view of an example of a tape drive apparatus according to the invention.

FIG. 1 shows an embodiment of the present invention, describing a general constitution of a helical scan tape drive apparatus. The figure shows the tape drive apparatus in its horizontal position, however, the tape drive apparatus may be placed to operate in vertical or any other positions.

In FIG. 1, numeral 1 denotes an entire tape drive apparatus. The tape drive apparatus 1 comprises a rotating magnetic head apparatus on a base chassis 1a for recording/reproducing information by sliding over and in contact with a magnetic tape, and a drum 2 of the rotating magnetic head apparatus is disposed between a takeup reel 3 and a cartridge mount mechanism 5 for a tape cartridge 4 housing a magnetic tape T. Guide paths 7a and 7b for respective loading pins 6a and 6b which constitute a tape loading mechanism are formed on both sides of the drum 2, forming a tape path a from the cartridge mount mechanism 5 through the takeup reel 3. The tape path a is a path of the magnetic tape, pulled out of the tape cartridge 4 inside the cartridge mount mechanism 5 by a tape-carrying mechanism, and loaded on the drum 2 in an approximate figure of letter M, and lead to the takeup reel 3. The drum 2 comprises at least a fixed drum and another drum rotating against the fixed drum. The rotating drum comprises a magnetic head that records/reproduces information signals on the magnetic tape T.

The takeup reel 3 that winds up the magnetic tape T has an insertion slot formed from part of the reel perimeter to the reel center for inserting the later explained leader block with the magnetic tape T clamped thereon. When the leader block is inserted through the insertion slot, the magnetic tape T is wound up by the rotation of the takeup reel 3 driven by the later explained drive mechanism.

A carrying mechanism 11 is disposed between the cartridge mount mechanism 5 and the takeup reel 3 for extracting the magnetic tape T out of the tape cartridge 4 mounted in cartridge mount section 5, as shown in FIGS. 1 through 5, and winding up on the takeup reel 3. The aforementioned carrying mechanism 11 comprises: a carrying section 13 for engaging the leader block attached to an end of the magnetic tape T housed in the tape cartridge 4 to carry the leader block between the tape cartridge 4 and the takeup reel 3, and a chucking mechanism 14 for engaging with, or releasing the engagement from a leader block 12 in conjunction with the movement of the carrying section 13.

The carrying section 13 of the carrying mechanism 11 comprises: a movable base 18 that is movably supported by a guide shaft 16 of an approximately round rod extended over one side of the top surface of a base plate 15; in this embodiment between the base cartridge mount section 5 end and the takeup reel 3 end on the outboard side; and a guide rail 17 of an approximately channel-like cross section formed parallel with the guide shaft 16 along the other side of the top surface; in this embodiment inboard side. The carrying section 13 of the carrying mechanism 11 further comprises a slide plate 20 that slides in conjunction with the movable base 18 over the bottom surface of the base plate 15, and along a guide groove 15a formed on the base plate 15 straddling between the cartridge mount mechanism 5 end and the takeup reel 3 end, conforming to the tape path around the drum 2.

Figure 2:
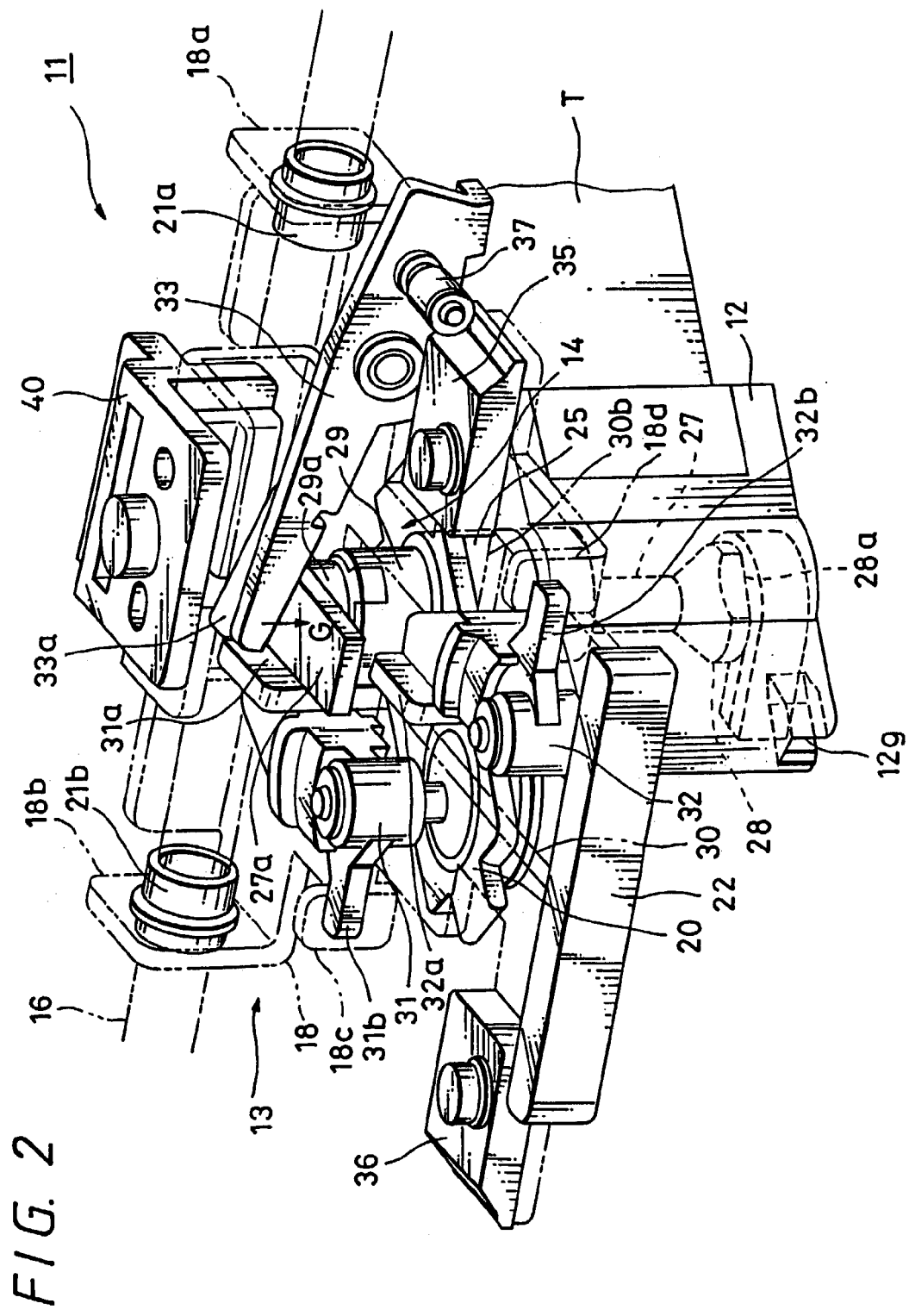
FIG. 2 is a perspective view of a major section of the tape drive apparatus of FIG. 1, showing a leader block in a chucked status.
Figure 3:
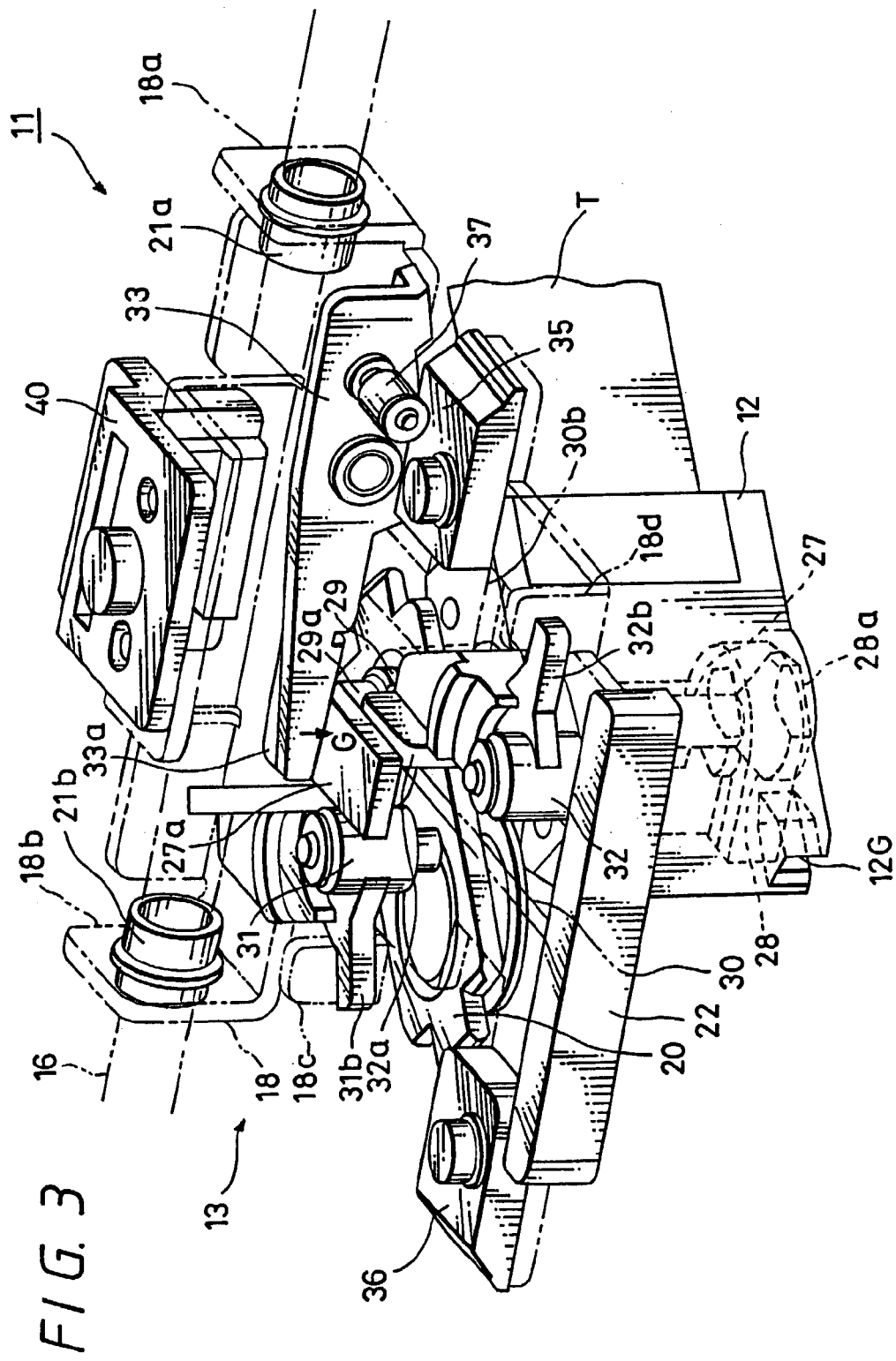
FIG. 3 is a perspective view of a major section of the tape drive apparatus of FIG. 1, showing the leader block in a released state from chucking.
Figure 4:
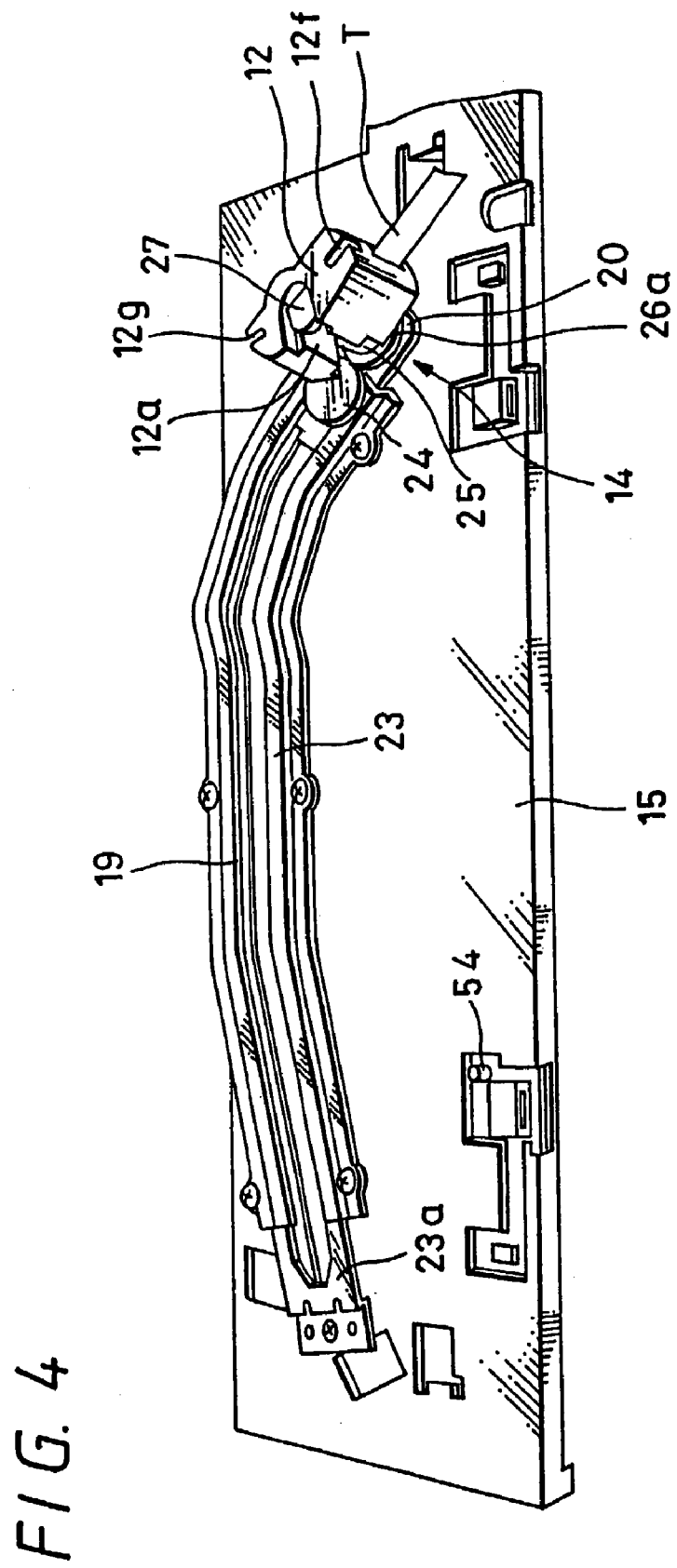
FIG. 4 is a perspective view showing the bottom surface of a carrying mechanism of the tape drive apparatus of FIG. 1.

The movable base 18 of the carrying section 13 of the carrying mechanism 11 is supported by the guide shaft 16 passing through bearings 21a and 21b fit into risers 18a and 18b formed on both sides of the outboard end of the movable base 18, as shown in FIGS. 2 and 3; and is supported by the guide rail 17 where a slide bar 22 formed with a smooth resin or other material and fixed on the movable base 18, is inserted in the approximately channel-like groove of the guide rail 17. The slide plate 20 is slidably fit in a guide rail 23 comprising a cam groove 19 fixed on the bottom surface of the base plate 15 and in conformance with the guide groove 15a, and is supported by a press member 24 pressed against the bottom surface of the guide rail 23, as shown in FIG. 4. On the end where the takeup reel 3 is disposed, a stopper groove plate 23a is fixed in sequence.

Figure 5:
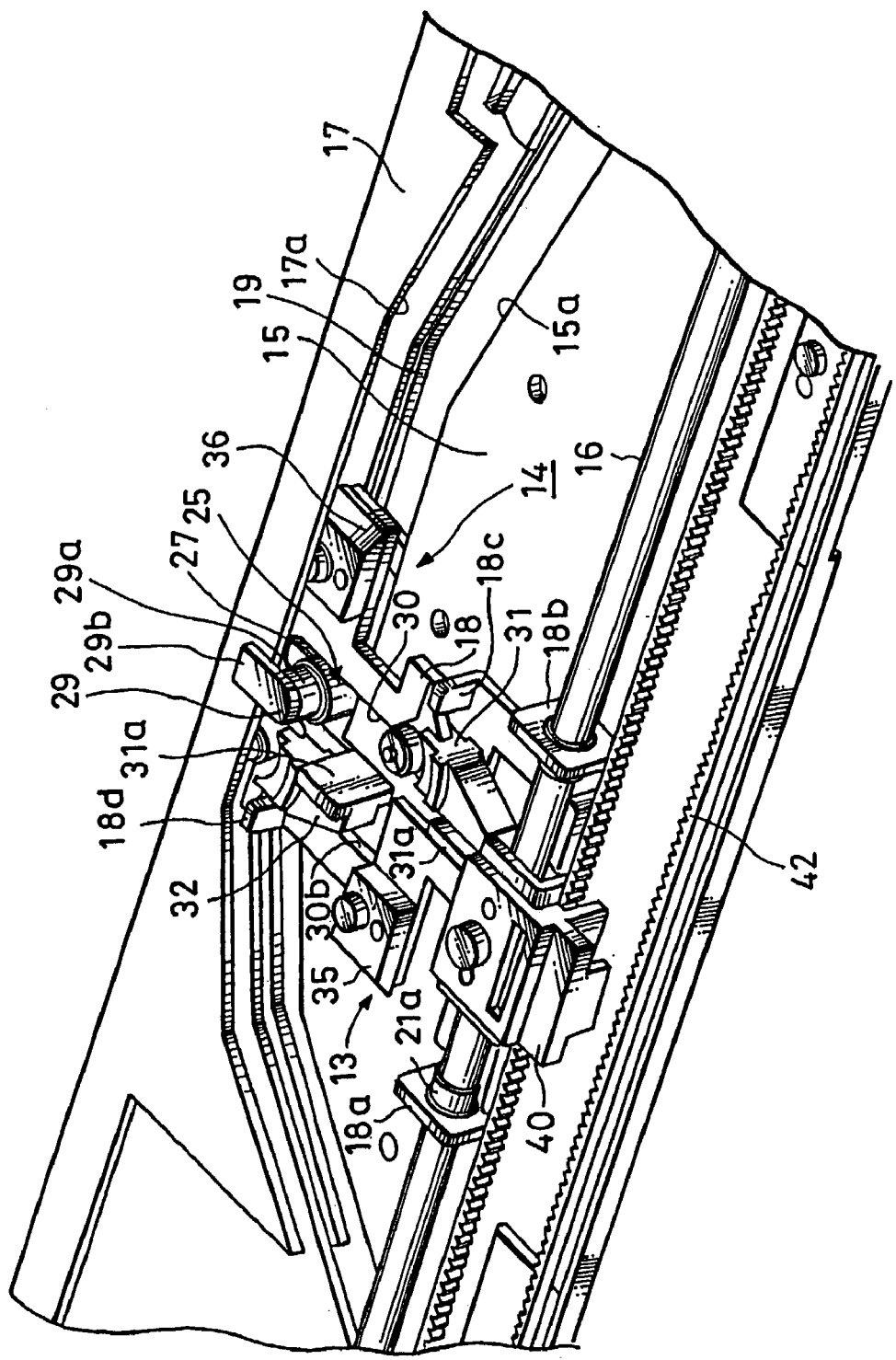
FIG. 5 is a perspective view showing the carrying section of the tape drive apparatus of FIG. 1.

As shown in FIGS. 1 and 5, the cam groove 19 is formed from the proximity of the tape extraction hole in the tape cartridge 4 mounted on the cartridge mount section 5 toward the center of the takeup reel 3, passing in the proximity of the drum 2 on the guide rail 23. The guide groove 15a is formed on the base plate 15, corresponding to the cam groove 19. The cam groove 19 is disposed in a manner of being sandwiched vertically between the movable base 18 of the carrying section 13 and the slide plate 20, where the slide plate 20 is guided by the guide rail 23, as shown in FIG. 5.

The guide rail 17 comprises, as shown in FIG. 5, a guide section 17a corresponding to the guide groove 15a, which guides the movement of the movable base 18. The guide section 17a is comprised of the guide rail 17 which is formed as uprising on the top surface of the base plate 15 and is bent into an approximately reversed-C shape, and the base plate 15. The slide bar 22 of the movable base 18 fits and freely slides in the movable base 18. The guide rail 17 that comprises the guide section 17a to be specific, protrudes along the guide groove 15a in the inward direction on the base plate 15.

Figure 6:
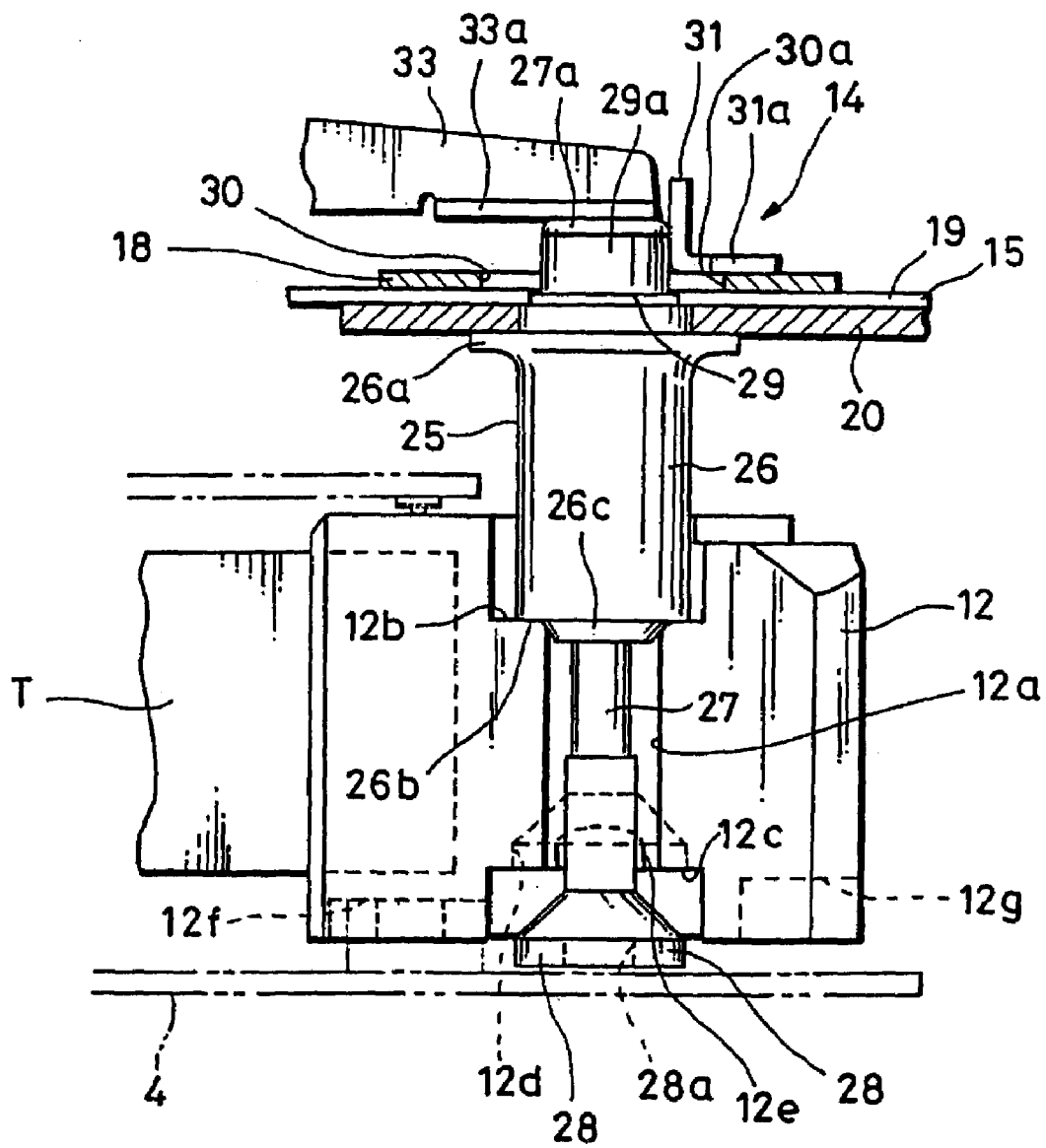
FIG. 6 is a side elevation view showing the leader block in the released state from chucking.
Figure 7:
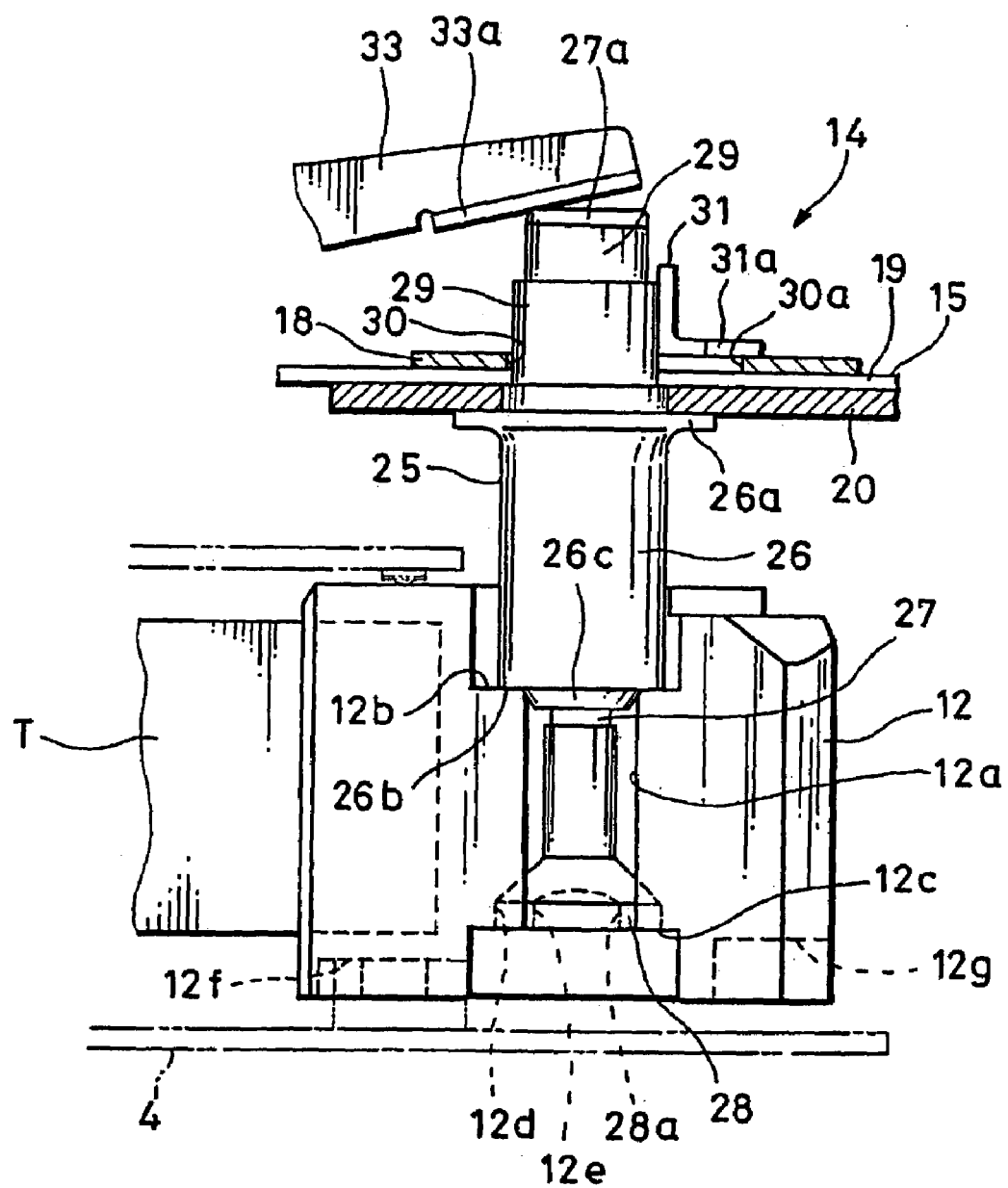
FIG. 7 is a side elevation view showing the leader block in the released state from chucking.
Figure 10:
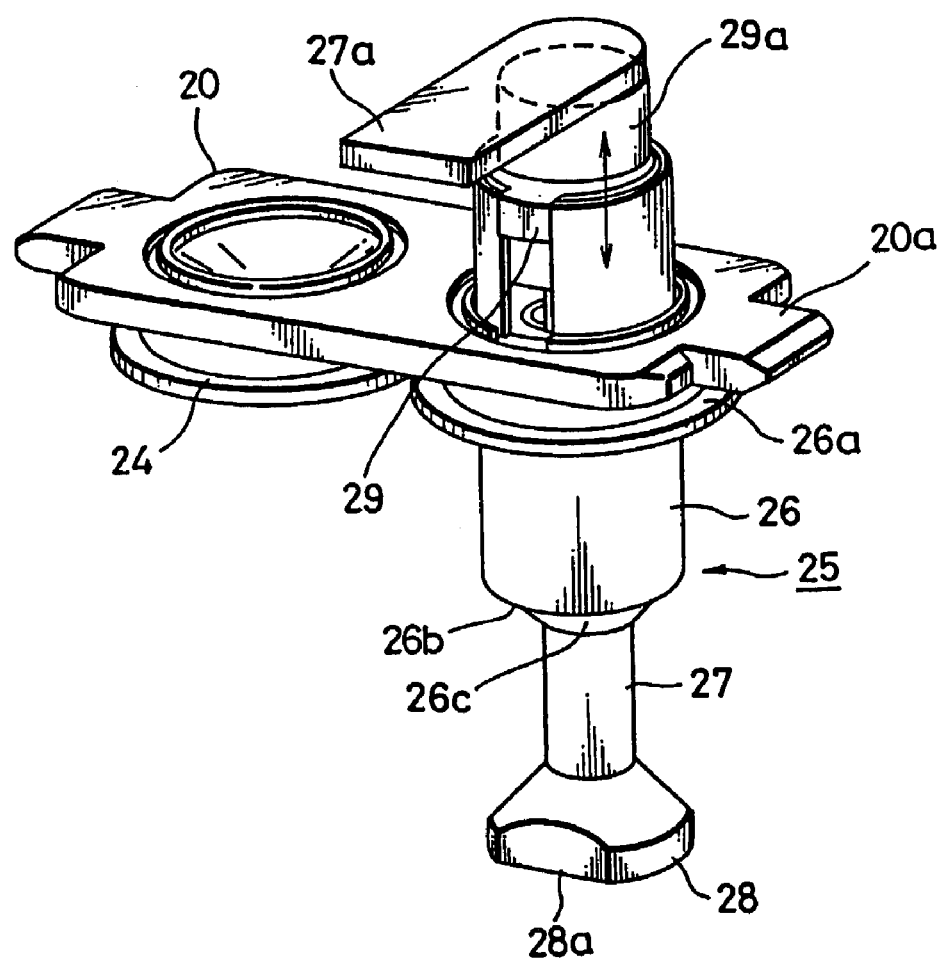
FIG. 10 is a perspective view showing a slide plate with a press section of a tape extraction member being forced upward.
Figure 11:
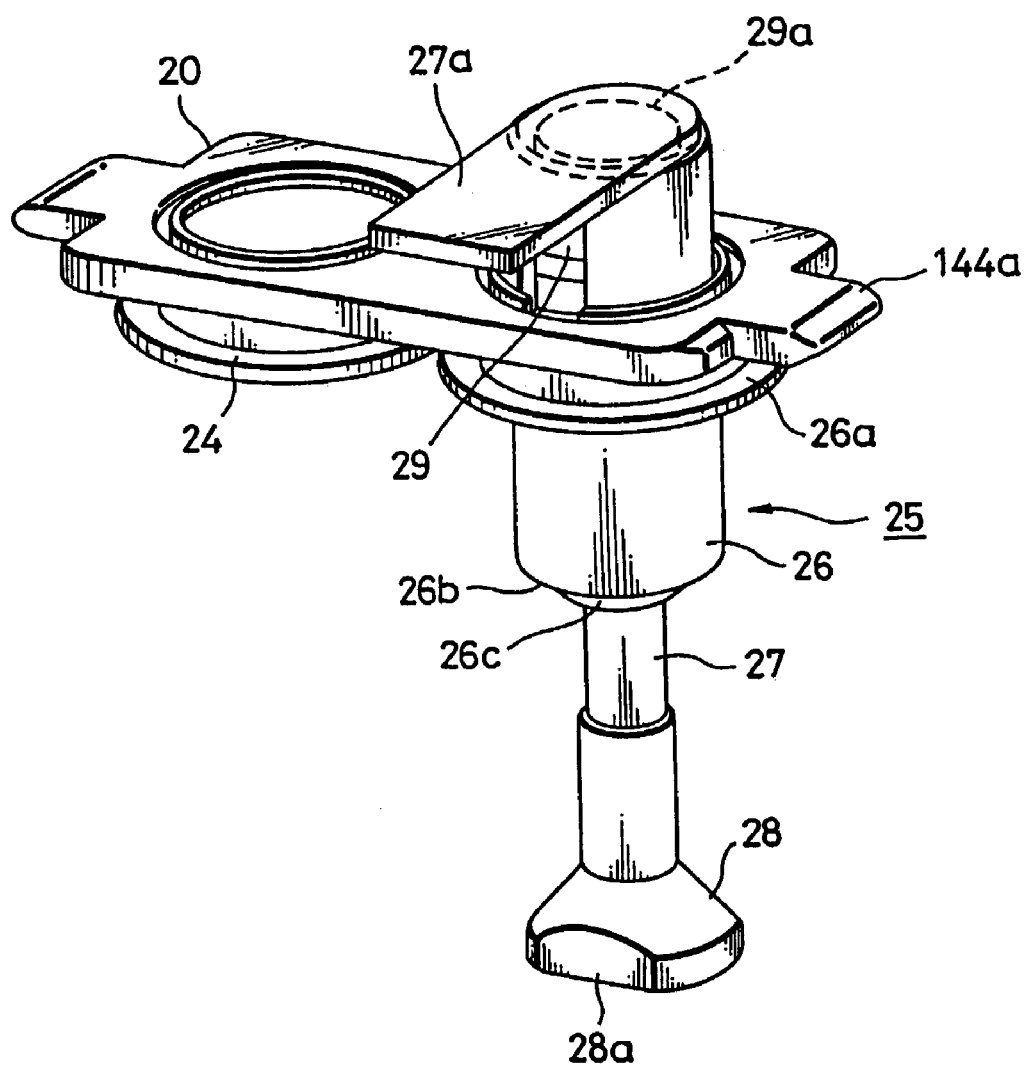
FIG. 11 is a perspective view showing the slide plate with the press section of the tape extraction member being pushed downward.

A chucking member 25 of the chucking mechanism 14 of the leader block 12 is attached to the slide plate 20 of the carrying section 13, as shown in FIGS. 6, 7, 10 and 11. The chucking member 25 is configured to be normally forced to slide upward, as shown in FIGS. 7, 10 and 11, by a forcing member, for instance, a compression coil spring mounted within an outer cylindrical body 26 fixed on the bottom surface of the slide plate 20, with a chucking pin 27 slidably inserted in the axial direction of the cylindrical body 26.

The chucking member 25, which is inserted through the slide plate 20 and chucks the leader block 12, comprises the outer cylindrical body 26; the chucking pin 27 that is inserted into the outer cylindrical body 26 and engages with the leader block 12; and an unlocking prevention plate 27a that is formed at the end of the chucking pin 27 and prevents the leader block 12 from being released from the engagement, as shown in FIGS. 6, 7, 10 and 11.

The outer cylindrical body 26 is inserted through a plate section 20a of slide plate 20, and comprises, on the bottom surface of the plate 20a, the guide groove 15a formed on the base plate 15, and a flange section 26a that is slidably fit to the guide rail 23 by being inserted therethrough.

The chucking pin 27 is configured to be normally forced to slide upward, as shown in FIG. 10, by a forcing member, for instance, a compression coil spring, mounted within the outer cylindrical body 26, slidably inserted in the axial direction of the outer cylindrical body 26.

The chucking pin 27 comprises on its lower end an engaging flange 28 that associates with the lower engaging section of the leader block 12. The engaging flange 28 comprises a notch 28a as shown in FIGS. 6 and 10. The chucking pin 27 also comprises a support section 29 at the top end thereof, and the support section 29 comprises a press section 29a at the top end thereof. The press section 29a, in the upwardly pressed state of the chucking member 25, is inserted through the cam groove 19 and the guide groove 15a, and into a guide groove 30 of the movable base 18, which is formed perpendicular to the guide groove 15a of the base plate 15 of the carrying mechanism 11; and the press section 29a protrudes out of the top surface thereof. The unlocking prevention plate 27a is formed as extended on top of the press section 29a. The unlocking prevention plate 27a is formed of an approximately flat-plate shaped member, and when the press section 29a is projected on the top surface of the movable base 18, projects out over the guide rail 17 formed on the base plate 15. Consequently, even if a pressure is exerted on the press section 29a during the carrying of the leader block 12, the unlocking prevention plate 27a is in contact with the top surface of the guide rail 17, and prevents the chucking pin 27 from being pushed down by the press section 29a, thereby preventing the leader block 12 from being unengaged.

The depressed chucking pin 27 of the chucking member 25 extends downward, as shown in FIG. 11, and enables the chucking member 25 to be inserted into the engaging part of the leader block 12. Upon insertion into the engaging part of the leader block 12, the chucking pin 27 contracts upward as the press section 29a springs back, causing the engaging flange 28 to associate with the positioning step on the leader block 12, thereby engaging with the leader block 12. At this time, the notch 28a formed on the engaging flange 28, of the chucking pin 27 comes in contact with the rotation restriction section formed on the positioning step. The position of the leader block 12 that is engaged with the chucking member 25 is determined, while the chucking member 25 prevents the leader block 12 from moving freely or becoming unengaged.

The chucking member 25, being inserted in the guide groove 30 of the movable base 18, is moved between the cartridge mount mechanism 5 and the takeup reel 3 along the guide groove 15a and the cam groove 19 in conjunction with the movement of the movable base 18.

As the press section 29a is pressed against press surfaces 33a and 34a of chucking release levers 33 and 34, the chucking member 25 is forced downward and inserted into an the engaging section 12a of the leader block 12, whereupon a bottom surface 26b of the outer cylindrical body 26 is supported by the upper engaging step of the leader block 12, and the engaging flange 28 of the chucking pin 27 is supported by the lower engaging step thereof, simultaneously. The chucking member 25, now relieved of the force of the chucking release levers 33 and 34, is forced upward by the force of the forcing member mounted in the outer cylindrical body 26, thereby engaging with the leader block 12. At this time, the chucking pin 27 prevents the leader block 12 from freely moving during the carrying, by butting the anti-rotation notch formed on the flange 28 against the rotation restriction section of the leader block 12.

The chucking member 25, engaged with the leader block 12, is unengaged therefrom, when the press surfaces 33a and 34a of the chucking release levers 33 and 34 press on the press section 29a, and consequently the chucking member 25 is forced downward, thereby ejecting the flange 28 from the positioning step of chucking pin 27 and releasing the engagement with the leader block 12.

At the time of the insertion of a cartridge, the aforementioned carrying mechanism 11 is in the stand-by status as described below.

As a roller 37 of the chucking release lever 33, which is one of the chucking levers on the base plate 15, rides on a cam 35 of the carrying section 13, the press surface 33a disposed at the end of a lever, is forced downward. The press surface 33a is forced downward, so that the press section 29a, disposed at the end of the chucking member 25 is pressed downward, also forcing the flange 28 of the chucking pin 27 downward.

Subsequently, as the chucking pin 27 is inserted into the engaging part of the leader block 12, a movable section 13 starts moving over to the takeup reel 3 side, thereby relieving the force on the chucking release lever 33 and the chucking pin 27 engaging with the leader block 12. At this time, the chucking pin 27 prevents the free movement of the leader block 12 as the notch 28a formed on the engaging flange 28 and a rotation restriction section 12e formed at the positioning step of the leader block 12 come in contact with each other.

Subsequently, the leader block 12, engaged with the chucking pin 27, is moved to the takeup reel 3 end together with the slide plate 20 by the movement of the carrying section 13 to the takeup reel 3 side.

When the carrying section 13 of the carrying mechanism 11 approaches the takeup reel 3, a roller 38 of the chucking release lever 34 provided on the base plate 15 rides on a cam 36, thereby forcing the press surface 34a at the end of the lever downward. Consequently, the flange 28 of the chucking pin 27 is ejected from a positioning step 12d of the leader block 12, thereby releasing the engagement with the leader block 12.

The base plate 15 comprises the chucking release levers 33 and 34 thereon, as shown in FIGS. 1 through 3, for releasing the engagement of the chucking member 25 with the leader block 12. The chucking release levers 33 and 34 comprise the press surfaces 33a and 34a, which press on the press section 29a of the chucking pin 27 of the chucking member 25, and the each of levers are supported in a see-saw fashion by a pivot on the base plate 15, in which the press surfaces 33a and 34a provided at the ends of the levers are forced upward by a spring member or others. The chucking release levers 33 and 34 include the rollers 37 and 38, provided on the other end of the levers on the movable base 18, which ride up on the cams 35 and 36. As the roller 37 and 38 ride up on the cams 35 and 36, the press surfaces 33a and 34a of the chucking release levers 33 and 34 respectively are forced in the direction indicated by arrow G in FIG. 2, thereby pressing on the press section 29a of the chucking member 25 down and releasing the engagement of the chucking member 25 with the leader block 12.

As shown in FIGS. 2, 3 and 5, the carrying mechanism 11, which is disposed on the base plate 15, freely movable, for carrying the chucking member 25 with the leader block 12 engaged with it, between the tape cartridge 4 and the takeup reel 3, comprises: the carrying section 13, which moves on the base plate 15, guided by the guide shaft 16 disposed on the base plate 15, and the slide plate 20, through which the chucking member 25 is inserted, which slides in conjunction with the movement of the carrying section 13 by means of the base plate 15. In the carrying mechanism 11, the press section 29a provided on the end of the chucking member 25, and inserted and held by the slide plate 20 is inserted freely movable to the guide groove 30 formed on the carrying section 13, and the carrying section 13 and the slide plate 20 are provided by means of the guide groove 15a on the base plate 15 and the cam groove 19.

The carrying mechanism 11 moving between the cartridge mount mechanism 5 and the takeup reel 3 on the base plate 15 comprises: the movable base 18, which comprises thereon the guide groove 30 with the chucking member 25 inserted therethrough, freely movable; a pair of rotation guides 31 and 32 provided on the movable base 18, which guide the chucking member 25 along the guide groove 30; and the cams 35 and 36, which push up the rollers 37 and 36 of the chucking release levers 33 and 34.

The guide groove 30, through which the chucking member 25 is inserted, is formed on the movable base 18 for guiding the movement of the chucking member 25, and formed perpendicular to the direction of the movement of the movable base 18; and comprises branch-groove sections 30a and 30b set in the moving direction of the movable base plate 18. The guide groove 30 guides the chucking member 25 into the branch groove section 30a or 30b when the movable section 13 moves near the cartridge mount mechanism 5 or the takeup reel 3, thereby enabling the chucking release levers 33 and 34 to press on the press section 29a of the chucking member 25.

The rotation guides 31 and 32, which guide the chucking member 25 along the guide groove 30, comprise: guide surfaces 31a and 32a that come in contact with the press section 29a of the chucking member 25; and stopper arm 31b and 32b that restrict the rotation of the rotation guides 31 and 32. The rotation guides 31 and 32 close up the branch-groove sections 30a and 30b, as the guide surfaces 31a and 32a are normally forced to the guide groove 30 side by a coil spring or the like, causing the stopper arms 31b and 32b to butt against stopper surfaces 18c and 18d, which are formed as protrusions on the base plate 18. The carrying section 13 approaching close to the cartridge mount mechanism 5 or the takeup reel 3 presses and rotates the guide surfaces 31a and 32a of the rotation guides 31 and 32 against the chucking member 25, which is guided by the guide groove 30, causing the branch groove 30a and 30b to open to the chucking member 25.

The cams 35 and 36, which push down the press surfaces 33a and 34a of the chucking release levers 33 and 34, comprise inclined surfaces, which allow the roller 37 and 38 of the respective chucking release levers 33 and 34 to ride up thereon. The carrying section 13 approaching close to a chucking release lever causes the roller 37 and 38 to ride up the inclined surfaces onto the cams 35 and 36. The upwardly pressed rollers 37 and 38, which have ridden up onto the cams 35 and 36, force the press surfaces 33a and 34a, provided at the end of the chucking release levers 33 and 34, into the direction of arrow G as shown in FIG. 2, thereby causing the chucking release levers 33 and 34 to depress the press section 29a of the chucking member 25 downward.

The carrying section 13 of the carrying mechanism 11 is connected through a supporting member 40 to a timing belt 42 of a drive mechanism 41. The timing belt 42 of the drive mechanism 41 is driven to cause the carrying section 13 of the carrying mechanism 11 moving between the cartridge mount mechanism 5 end and the other end where the takeup reel 3 is provided to move.

The drive mechanism 41 is designed such that a motor $M_L$ for moving the leader block shown in FIG. 1 causes a gear mechanism 43 to drive, thereby rotating the timing belt 42. The drive mechanism 41 is controlled by the supporting member 40 of the movable base 18 responding to position sensors 44 and 45 disposed on the cartridge mount mechanism 5 end and on the other end where the takeup reel 3 is installed on the base plate 15.

The slide plate 20, which carries the leader block 12 in conjunction with the movement of the carrying section 13 of the carrying mechanism 11, comprises the approximately rectangular plate section 20a, as shown in FIGS. 2, 10 and 11, through which the chucking member 25 is inserted for chucking the leader block 12. The plate section 20a comprises, on the bottom surface side thereof, a pressing member 24 shaped as a flange; and the pressing member 24 is installed in a position on the base plate 15 such as to slide freely along the guide groove 15a and the guide rail 23 on the rear surface side of the base plate 15.

The tape cartridge 4, in which the magnetic tape T carried by the tape carrying mechanism 11 configured as described above is reeled in, comprises: as shown in FIG. 12, a cartridge unit 401, which is one pair of top and bottom halves 403 and 404 butted together; a tape reel 410 on which the magnetic tape T is wound up to be stored in the cartridge unit 401; and a reel lock 411 which prevents free movement of the tape reel 410 when the tape cartridge 4 is not in use, and not mounted on the drive apparatus 1. When the tape cartridge 4 is inserted into the cartridge mount mechanism 5 of the drive apparatus 1, the reel lock 411 is released the engagement with the tape reel 410, and the leader block 12 with magnetic T clamped thereon is pulled out by the tape carrying mechanism 11 on the drive apparatus 1 end to be directed to the takeup reel 3 within the drive apparatus 1 and is wound up onto the takeup reel 3, thereby the tape T being run.

Figure 12:
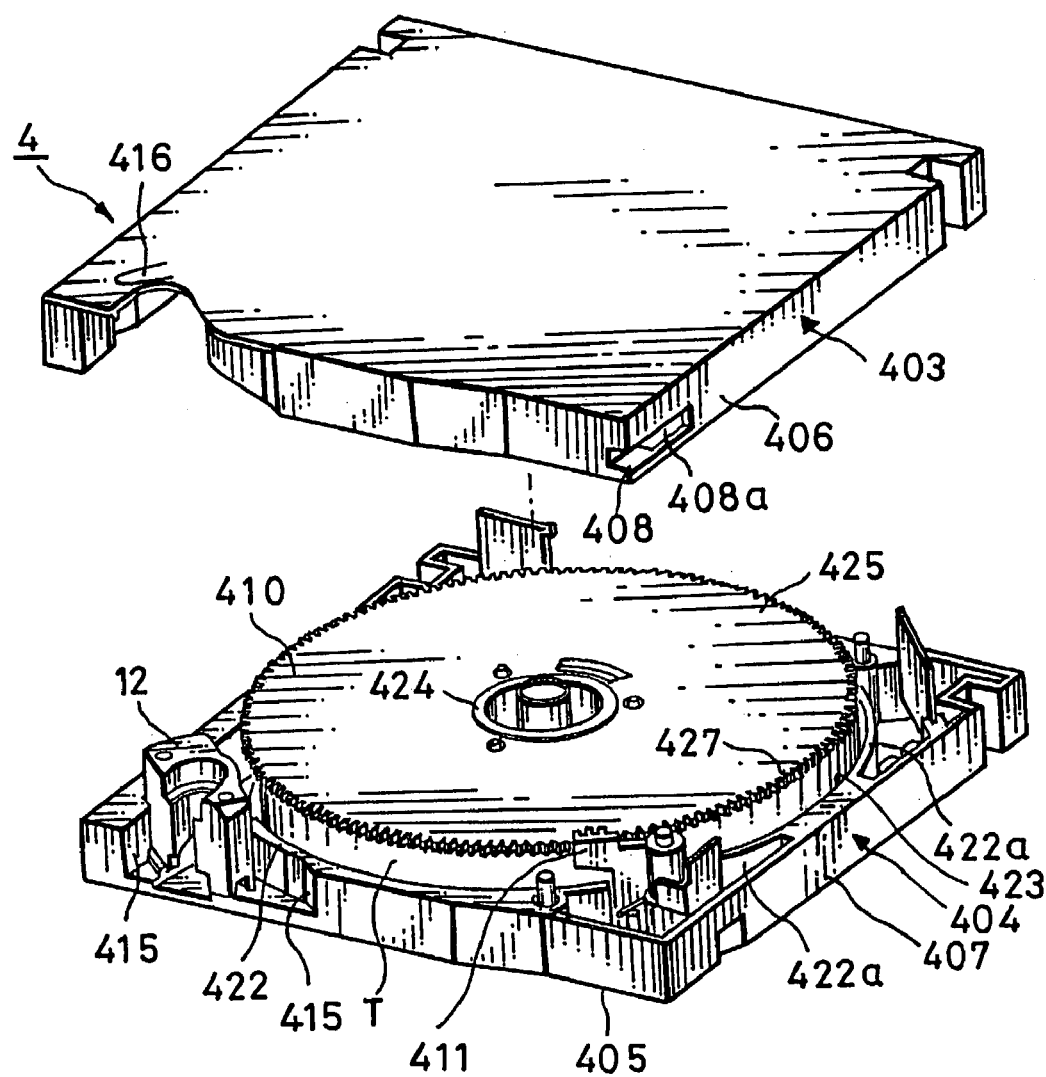
FIG. 12 is a perspective view showing a tape cartridge applied to the present invention.
Figure 13:
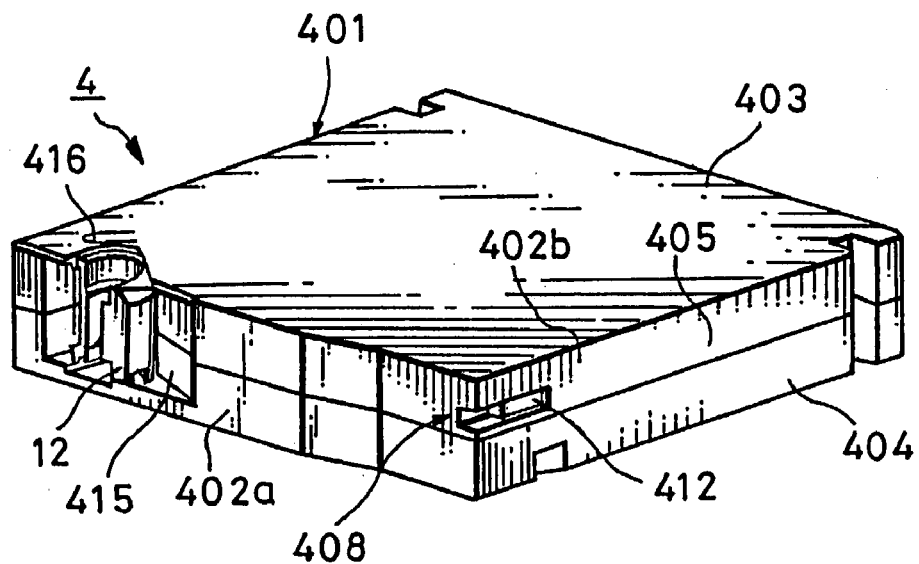
FIG. 13 is a perspective view showing the upper surface of the tape cartridge applied to the present invention.
Figure 14:
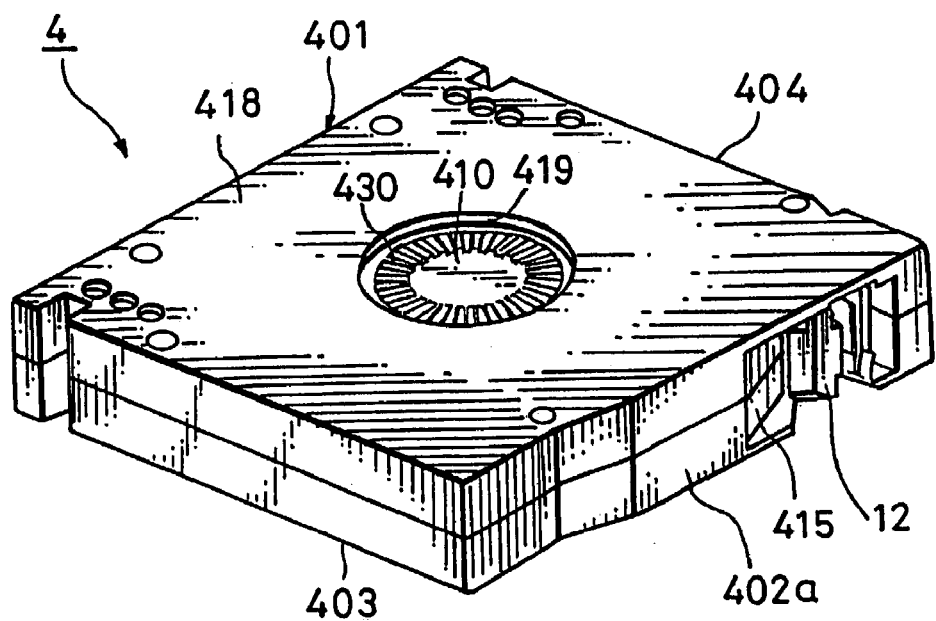
FIG. 14 is a perspective view showing the bottom surface of the tape cartridge applied to the present invention.

The top and bottom halves 403 and 404 constituting the cartridge unit 401 formed of ABS resin or other synthetic resin, are formed into an approximately rectangular shape by an injection molding or other method, as shown in FIGS. 12, 13 and 14. The top and bottom halves 403 and 404 are formed in such size that allows the tape reel 410 to store and permit free rotation of the magnetic tape T therein, when the cartridge unit 401 is assembled. The top and bottom halves 403 and 404 comprise rising walls 406 and 407 built therearound, when the top and bottom halves 403 and 404 are butted together and constitute an external wall 405. The top and bottom halves 403 and 404 further comprise an approximately arc-shape partition forming walls 422a, which forms a partition wall 422 in the cartridge 401 when the top and bottom halves 403 and 404 are butted together, internally in contact with the rising walls 406 and 407. When the top and bottom halves 403 and 404 are butted together to assemble the cartridge unit 401, a tape reel storing section 423 which contains the tape reel 410 is formed with the external wall 405 and partition wall 422.

A reel-lock release member entry groove 408, into which a reel-lock release member 517 placed on the cartridge mount mechanism 5 end is directed, is formed from the end of a drive apparatus insertion side surface 402a to one side surface 402b, on an external wall 405 of the cartridge unit 401. The reel-lock release member entry groove 408 is formed by cutting a groove of an approximately channel-shaped cross section in a side surface of the top half 403 or bottom half 404, and in the direction of the side surface 402b, with the end thereof open on the drive unit insertion end. The reel-lock release member entry groove 408 comprises a shutter-installation hole 408a with the bottom surface side thereof being cut out in approximately rectangular shape for disposing a movable shutter 412 (to be described later) therein.

The reel lock 411, which prevents the free movement of the tape reel 410 (to be described later), is disposed in the proximity of the reel-lock release member entry groove 408. The reel-lock release member entry groove 408 is closed out by the shutter 412, which is disposed within the cartridge unit 401 and prevents the interior of the cartridge unit 401 from being exposed to the outside. Upon the insertion of the tape cartridge 4 into the cartridge mount mechanism 5, the reel-lock release member entry groove 408 allows the reel-lock release member 517, which unlocks the tape reel 410 by pressing on the reel lock 411 through the shutter 412 provided on the cartridge mount mechanism 5 end, to be directed into the groove 408.

Figure 16:
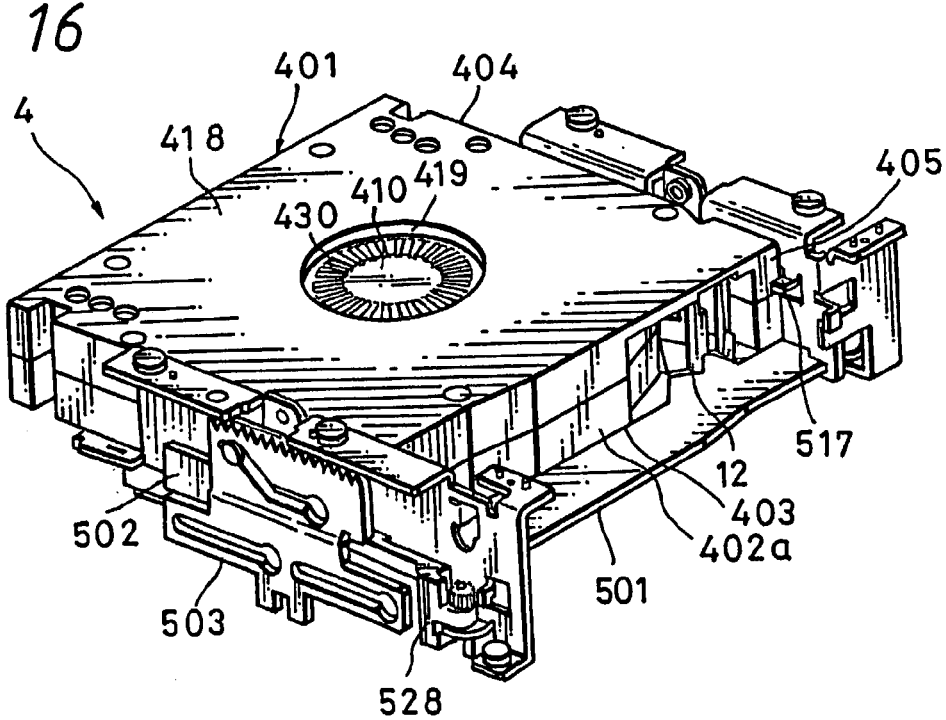
FIG. 16 is a perspective view showing the tape cartridge, which is wrongly inserted into the drive unit, applied to the present invention.

The reel-lock release member entry groove 408, being formed either on the top half 403 or on the bottom half 404, is therefore formed either on the top or bottom end of the thickness of the cartridge unit 401. As shown in FIG. 16, this prevents the tape cartridge 4 from being inserted all the way into the loading position, even if the cartridge 401 is inserted upside down during the insertion into the cartridge mount mechanism 5 of the drive apparatus 1, since the reel-lock release member 517, provided inside the drive unit to meet the reel-lock release member entry groove 408, hits the external wall 405 of the cartridge unit 401.

Figure 15:
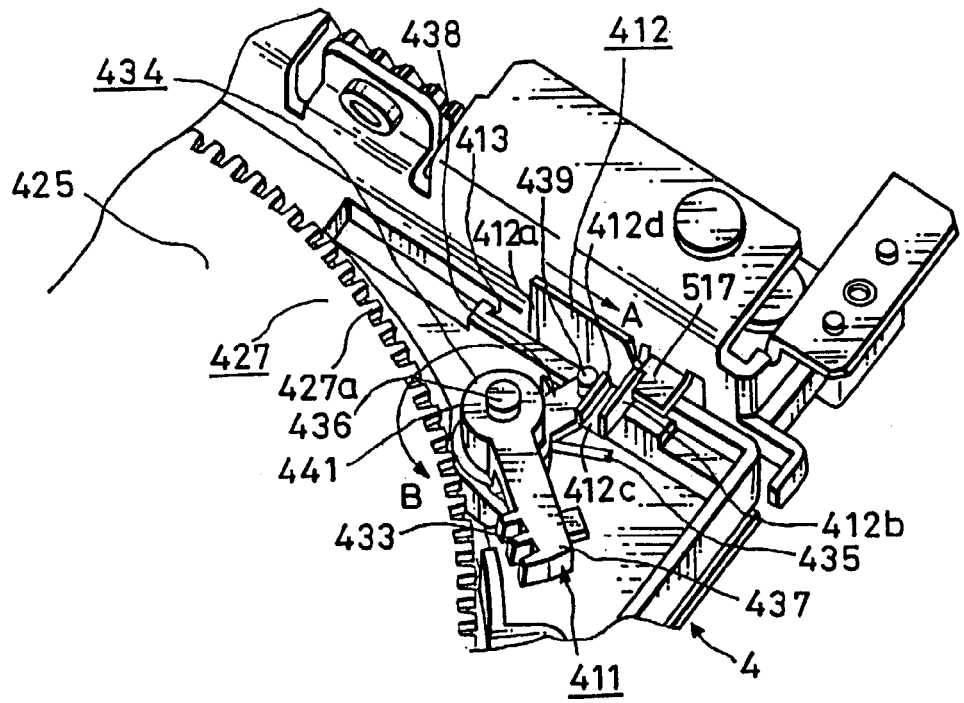
FIG. 15 is a perspective view showing a shutter section and reel lock of the tape cartridge applied to the present invention.

The shutter member 412, which is disposed in the reel-lock release member entry groove 408 and prevents dust and the like from entering the cartridge 401, comprises: a shutter 412a, which is formed in an approximately flat-plate shape, as shown in FIG. 15 and prevents dust and other entries; a first press section 412b provided on one end of the shutter 412a, which is pressed on by the reel-lock release member 517 on the cartridge mount mechanism 5 side; and a second press section 412d provided through the first press section 412b and a connecting section 412c, which presses on the reel lock 411.

The shutter member 412 is supported, free to move, with a shutter-guide groove 413, which is formed on one side surface 402b, corresponding to the reel-lock release member entry groove 408 of the top half 403 or bottom half 404, as shown in FIG. 15. The shutter member 412 is installed, supported by the shutter guide groove 413, with the shutter 412a being disposed on the side surface 402b end of the shutter-installation hole 408a, while the first press section 412b is disposed on the side surface which is on the cartridge mount mechanism 5 end. Thus, the shutter-installation hole 408a in the reel-lock release member entry groove 408 is closed, thereby closing the cartridge unit 401 from the outside.

The second press section 412d of the shutter member 412 is in contact with the press shaft of the reel lock 411 (to be described later). The second press section 412d of the shutter member 412 is pressed by the force of a twisted coil spring, which applies a force on the reel lock 411, in the direction of arrow A, in FIG. 15, to close up the cartridge unit 401 normally.

When the tape cartridge 4 is inserted into the cartridge mount mechanism 5 of the drive apparatus 1, the reel-lock release member 517 provided on the cartridge mount mechanism 5 end, enters through the reel-lock release member entry groove 408, and presses on the first press section 412b, thereby pressing shutter member 412 in the opposite direction to arrow A, shown in FIG. 15, against the force exerted by the twisted coil spring of the reel lock 411. This causes the press shaft of the reel lock 411, which is in contact with the second press section 412d, to be pressed in the opposite direction to arrow A, shown in the figure, to release the lock of the tape reel.

When the tape cartridge 4 is ejected out of the cartridge mount mechanism 5 of the drive apparatus 1, the second press section 412*d* of the shutter member 412 is pressed in the direction of arrow A, shown in FIG. 15, by the force exerted by the twisted coil spring of the reel lock 411, thereby closing up the reel-lock release member entry groove 408 of the cartridge unit 401.

As heretofore described, the shutter member 412 always closes up the cartridge unit 401 while the tape cartridge 4 is not used and not inserted into the cartridge mount mechanism 5 of the drive apparatus 1, thereby preventing the magnetic tape T from being soiled and damaged by dust and others which enters into the cartridge unit 401, and also preventing the deterioration of recording/reproducing characteristics of the magnetic tape T.

As shown in FIG. 12, a tape extraction hole 415 from which the magnetic tape T is extracted, is formed on the external wall 405. The tape extraction hole 415 is formed by cutting notches on the other end of the drive apparatus insertion side surface 402*a* of the top and bottom halves 403 and 404 and butting the notches together. On the tape extraction hole 415, the leader block 12, with the other end of the magnetic tape T clamped to the interior thereof, is engaged and facing outward.

Figure 17:
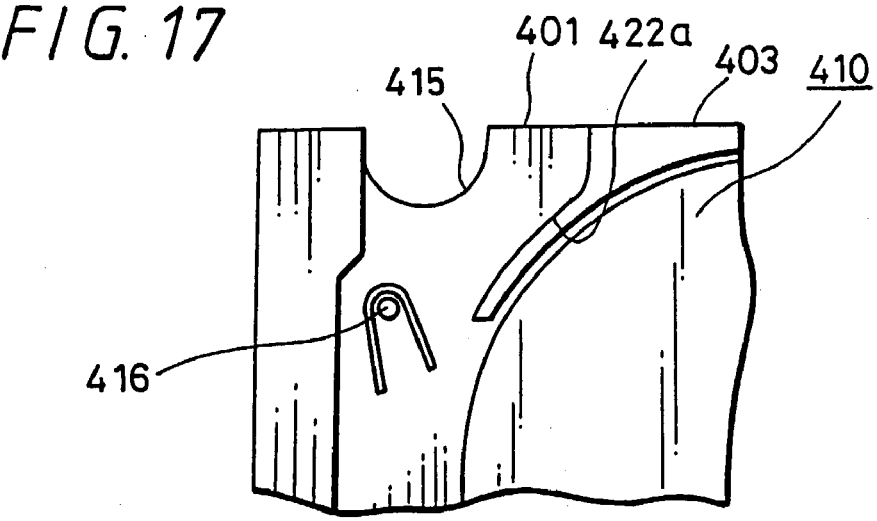
FIG. 17 is a plan view showing a partial upper surface of the tape extraction hole in the tape cartridge applied to the present invention.

The tape extraction hole 415 comprises a leader block press piece 416 on the top half 403 as shown in FIG. 17. The leader block press piece 416 comprises a engaging protrusion section 416*a* formed thereon, which engages with a engaging depression section 12*h* formed on the top surface of the leader block 12. As the leader block 12 is stopped in the tape extraction hole 415, the engaging protrusion 416*a* and engaging depression 12*h* are engaged together, resulting in determination of a position of the leader block 12, and preventing the rattling of the leader block 12 stored in the tape extraction hole 415.

A bottom plate 418 of the lower half 404 comprises a reel drive insertion hole 419 formed at approximate center thereof, for the insertion of a reel drive that rotates the tape reel 410 of the drive apparatus end.

The tape reel 410, where the magnetic tape T is reeled in, rotatably housed inside a tape reel housing 423 of the cartridge unit 401, comprises a reel hub 424, which reels in the magnetic tape T, and a pair of reel flanges 425 and 426, which are installed on both sides of the reel hub 424, as shown in FIG. 12.

One end of the magnetic tape T is attached to the reel hub 424. The reel hub 424 comprises, on the bottom surface thereof, an engaging section 430, which engages with the drive shaft of the drive apparatus 1. The engaging section 430 is exposed to the outside from the reel drive insertion entrance 419. As the tape cartridge 4 is inserted into the cartridge mount mechanism 5, the engaging section 430 is engaged with a reel drive of a reel rotation mechanism provided on the cartridge mount mechanism 5 end, thereby being driven to rotate.

The reel flanges 425 and 426, formed at the top and bottom ends of the reel hub 424, restrict the position where the magnetic tape T reeled onto the reel hub 424, is to be wound. The reel flanges 425 and 426 are formed into an approximately round disc shape, as shown in FIG. 12, with joining pins inserted through the top and bottom surfaces of the reel hub and bonded in place by heat-caulking. At least the top reel flange 425 comprises meshing teeth 427*a* formed on the external perimeter thereof, which mesh with the reel lock 411 to become a restricting section 427 restricting the free movement of the tape reel 410, as shown in FIG. 15. The meshing teeth 427*a* of the restricting section 427, which mesh with the reel lock 411, are formed at constant intervals all around the perimeter of the top reel flange 425.

Figure 18:
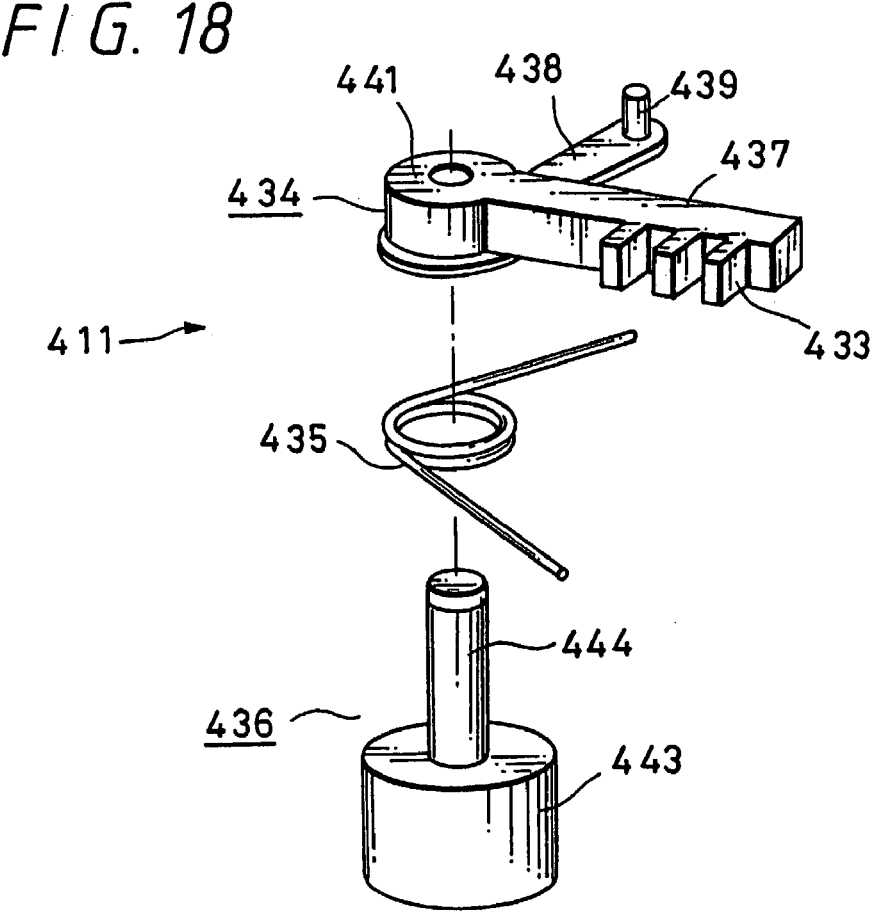
FIG. 18 is a perspective view of the reel lock.

The reel lock 411, which restricts the free movement of the tape reel 410 by meshing with meshing teeth 427*a*, comprise: a lock 434, which comprises a restricting protrusion 433 that meshes with meshing teeth 427*a*, a twisted coil spring 435 which forces the lock 434 to the tape reel 410 end, and a support shaft 436 which is inserted through the lock 434 and twisted coil spring 435 to rotatably support the lock 434 and twisted coil spring 435, as shown in FIGS. 15 and 18.

The lock 434 comprises: a restricting arm 437, on which the restricting protrusion 433 is formed to mesh with the meshing teeth 427*a* of the restricting section 427; a rotation plate 438, which is integrally formed on the bottom surface of the restricting arm 437; and a press shaft 439, which is disposed at the end of the rotation plate 438 and which comes in contact with the second press section 412*d* of the shutter member 412 disposed inside the reel-lock release member entry groove 408. The restricting protrusion 433 comprises a plurality of teeth formed on it, which protrude toward the top reel flange 425, and are disposed such as to be capable of meshing with the teeth 427*a* of the restricting section 427, formed on the external perimeter of the top reel flange 425, when brought close to the tape reel 410 end. The restricting arm 437 comprises a through hole formed on the arm base end thereof for passing the support shaft 436. The rotation plate 438, which is integrally formed with a rotation section 441 on the bottom side of the rotation section 441, is extended over to the end where the reel-lock release member entry groove 408 is provided, and comprises the press shaft 439 protruding at the end thereof. Here, the press shaft 439 is in contact with the second press section 412*d* of the shutter member 412, which is disposed on the reel-lock release member entry groove 408 of the cartridge unit 401; conveys the force of the twisted coil spring 435 to the shutter member 412; and conveys the pressure from the reel-lock release member 417 to the lock 434 through the shutter member 412 when the tape cartridge 4 is inserted into the cartridge mount mechanism 5, thereby releasing the lock of the tape reel 410.

The twisted coil spring 435 disposed at the bottom of the lock 434, which forces the lock 434 toward the tape reel 410 end, comprises the support shaft 436 inserted through the through hole in the center thereof, and one end of the twisted spring is engaged to stop by a holding piece 442 formed on the inside of the side surface 402*b* of the cartridge unit, while the other end of which is engaged to stop by the restricting arm 437 of the lock 434. The foregoing arrangement keeps the twisted coil spring 435 normally forcing the restricting arm 437 of the lock 434 toward the tape reel 410 end, causing the restricting-protrusion section 433 to mesh with the meshing teeth 427, thereby preventing the free movement of the tape reel 410; and simultaneously, forcing the press shaft 439 protruding at the end of the rotation plate toward the direction of arrow A shown in FIG. 15. Consequently, the press shaft 439 presses on the second press section 412*d* of the shutter member 412, keeping the cartridge unit 401 normally closed.

The support shaft 436, which rotatably supports the rotation section 441 of the lock 434 and twisted coil spring 435 by passing through them, comprises: a base 443 provided in the bottom half of the cartridge unit and a through shaft 444, which projects from the base 443 and passes through the through hole in the rotation section 441 and twisted coil spring 435. The base 443 comprises an approximately round column, whose diameter is approximately the same as or larger than that of the insertion holes in the rotation section 441 and twisted coil spring 435, stably supporting the lock 434 and twisted coil spring 435, which are inserted into the through shaft 444. The base 443 is formed as high as to position the restricting-protrusion section 433 of the lock 434 opposite to the meshing teeth 427 of the restricting section 427 formed around the top reel flange 425.

Figure 19:
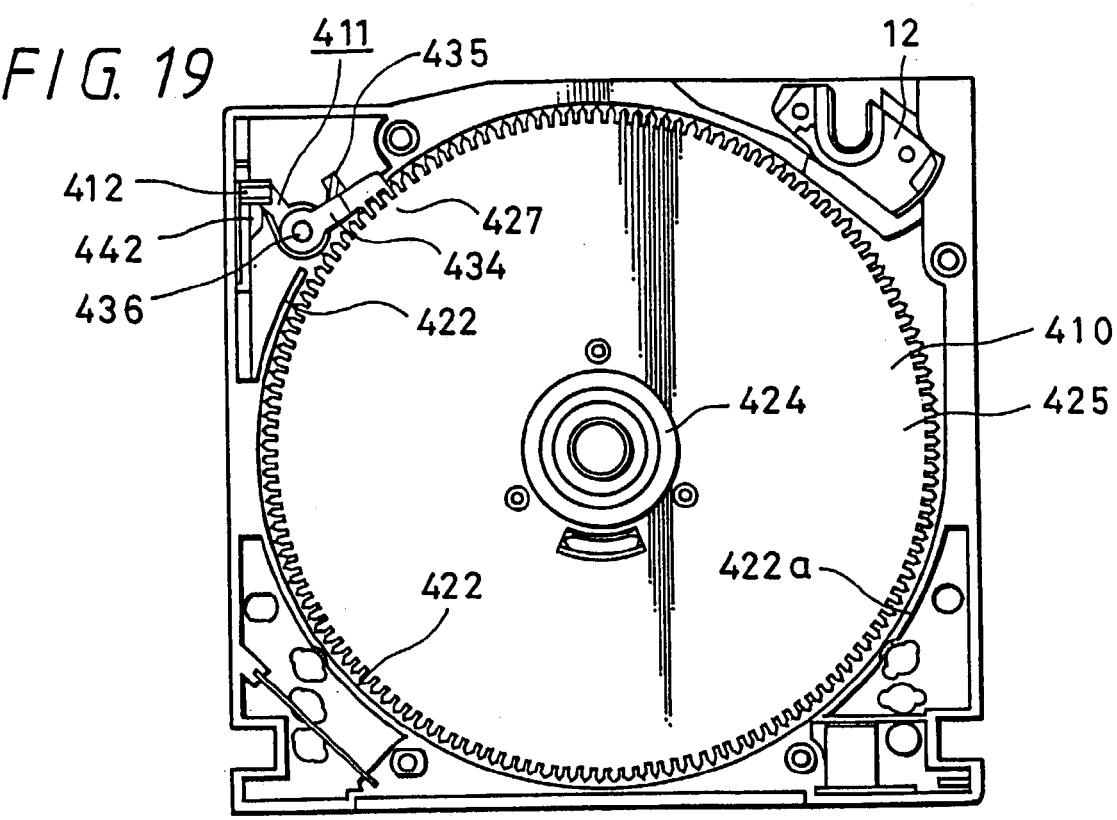
FIG. 19 is a plan view showing the cartridge with the tape reel engaged with the reel lock.

The reel lock 411, configured as heretofore described, is disposed within the cartridge unit 401, where the twisted coil spring 435 is held by the holding piece 442 formed on the inside of the side surface 402b of the cartridge unit 401 and by the restricting arm 437 of the lock 434, and normally forces the lock 434 to the tape reel 410 end, as shown in FIG. 19, to restrict the free movement of the tape reel 410.

Figure 20:
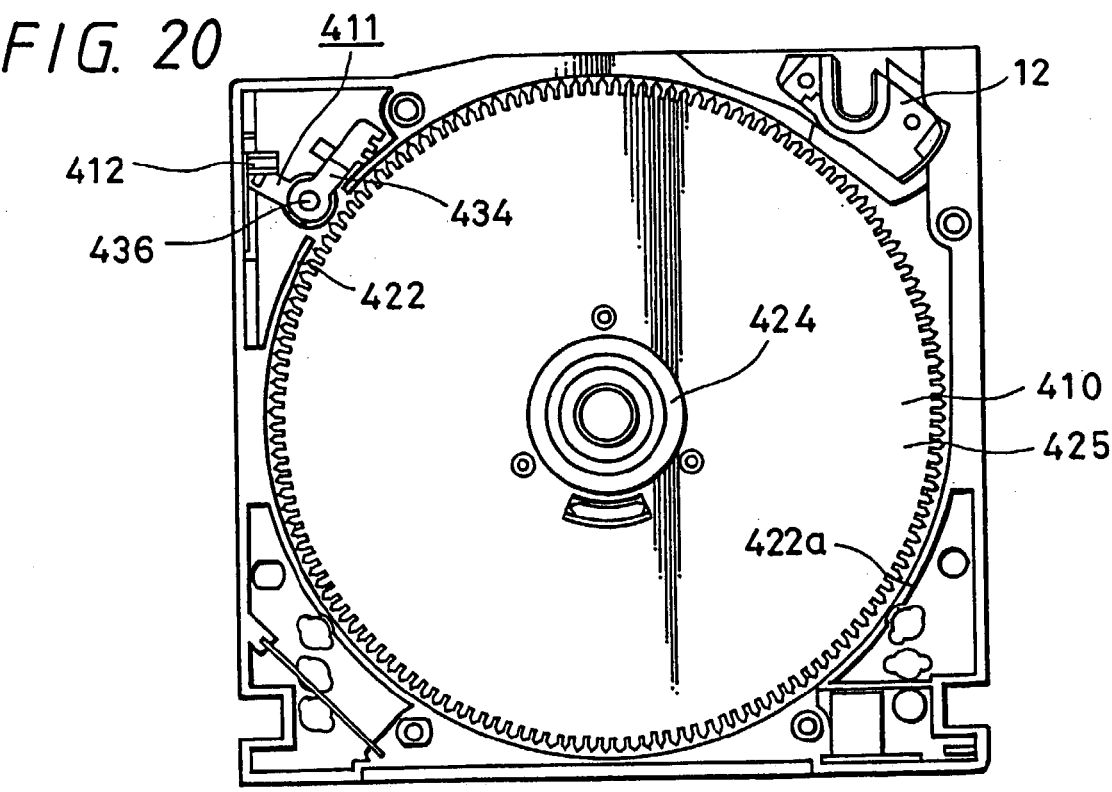
FIG. 20 is a plan view showing the cartridge without the tape reel engaged with the reel lock.

When the tape cartridge 4 is inserted into the cartridge mount mechanism 5, the reel-lock release member 517 provided on the cartridge mount mechanism 5 end, presses on the first press section 412b of the shutter member 412; and the second press section 412d presses on the press shaft 439, thereby forcing the reel lock 411 in the opposite direction to arrow A, shown in FIG. 15, and the rotation lock 434 being rotated in the direction of B, shown in FIG. 15, against the force of the twisted coil spring 435. Consequently, as shown in FIG. 20, the restricting protrusion section 433 of the reel lock 411 is released from the meshing teeth 427a of the top reel flange 425, allowing the tape reel 410 to rotate.

The reel-lock release member 517 mounted in the tape cartridge mount mechanism 5 is always forcing the press shaft 439, through the shutter member 412, in the opposite direction to arrow A, shown in FIG. 15, when the tape cartridge 4 is mounted in the tape cartridge mount mechanism 5. Therefore, the reel lock 411 is maintained in the rotated position in the direction of arrow B, also shown in FIG. 15. Consequently, the tape reel 410 is always rendered rotatably free.

When the tape cartridge 4 is ejected from the cartridge mount mechanism 5, the reel-lock release member 517 retreats out of the cartridge unit 401, relieving the force imposed on the reel lock 411 toward the press shaft 439, but allowing the force of the twisted coil spring 435 to force the lock 434 toward the tape reel 410 end. Consequently, the restricting protrusion section 433 of the lock 434 in the reel rock 411 meshes with the meshing teeth 427a of the top reel flange 425, thereby preventing the free movement of the tape reel 410.

Various information signals, such as audio signals, video signals, data for computer processing, and other information signals are recorded on the magnetic tape T, which is wound onto the tape reel 410. The Aforementioned leader block 12, which is held by the chucking member 25 of the tape carrying mechanism 11 within the drive apparatus 1 to be guided to the takeup reel end, is attached to the end of the magnetic tape T, which is wound onto the tape reel 410.

Figure 8:
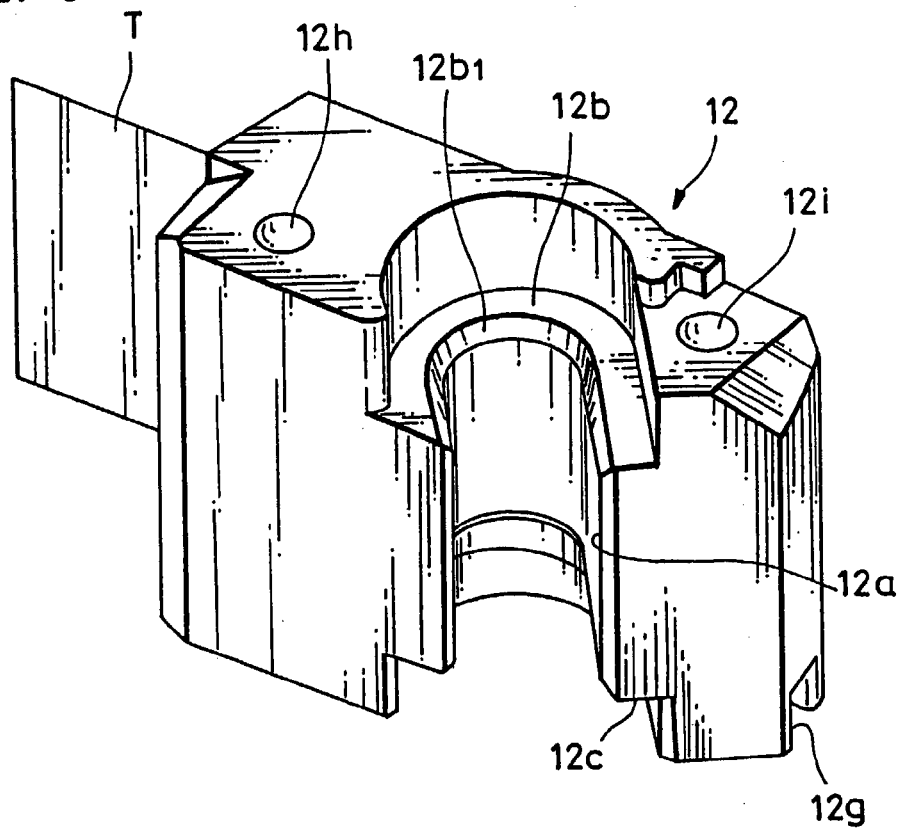
FIG. 8 is the perspective view showing the upper surface of the leader block.
Figure 9:
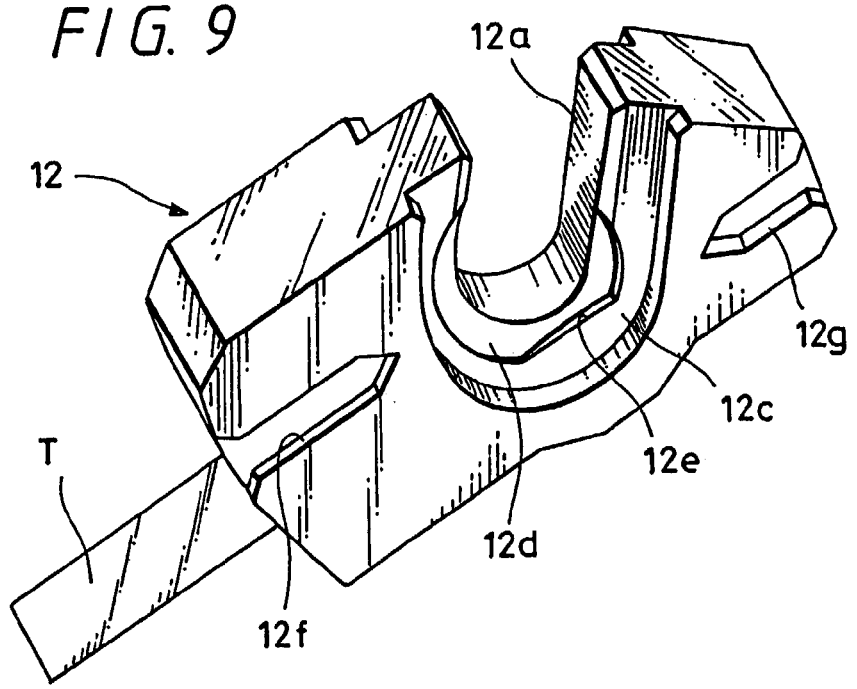
FIG. 9 is the perspective view showing the bottom surface of the leader block.

The leader block 12 comprises: the engaging section 12a, to which chucking pin, projecting downward from the outer cylindrical body of the chucking member 25 and the outer cylindrical body 26, is inserted; a top side engaging step 12b, which is formed on the top side of the engaging section 12a and to which the bottom surface of the outer cylindrical body is engaged; and a bottom side engaging step 12c, which is formed on the bottom side of the engaging section 12a and to which the flange 28 of the chucking pin 27 is engaged, as shown in FIGS. 8 and 9.

As shown in FIGS. 8 and 9, the engaging section 12a and the top and bottom side engaging steps 12b and 12c comprise a butting section in an approximate letter C shape formed thereon, against which the bottom surface 26b of the outer cylindrical body 26 and the flange 28 of the chucking pin 27 are butted. The leader block 12 is engaged with the chucking member 25 by butting the chucking pin 27 against the engaging section 12a and top- and bottom-side engaging steps 12b and 12c. Consequently, the position of the leader block 12 is determined, thereby preventing the leader block 12 from rotating and rattling during being carried.

The topside engaging step 12b comprises a positioning section $12b_1$ formed thereon, which corresponds to a tapered surface 26c formed on the bottom side of the outer cylinder 26 of the chucking member 25. Positioning section $12b_1$ is formed as an inclined surface from the topside engaging step 12b to the engaging section 12a. When the leader block 12 is engaged with the chucking member 25, the positioning section $12b_1$ comes in contact with the tapered surface that is formed on the chucking pin 27. Consequently, the leader block 12 is reliably engaged with the chucking pin 27.

The leader block 12 comprises the positioning step 12d, where the flange 28 formed on the chucking pin 27 comes in contact with, formed between the engaging section 12a and bottom side engaging step 12c. The positioning step 12d comprises: a butting section in an approximate shape of letter C; and the rotation restriction section 12e formed on part of internal perimeter thereof, which restricts the rotation of the leader block 12 and is provided corresponding to the anti-rotation notch 18 formed on the flange 28 of the chucking pin 27, which is part of the butting section. The rotation restriction section 12e is formed in a bow-string like shape as a whole on part of the butting section which is in a bow-like shape. The notch 28a, formed also in a bow-string like shape, on the flange 28 of the chucking pin 27 butts against the rotation restriction section 12e. The positioning step 12d comprises a positioning section 12d formed with an inclined surface, provided to correspond to the flange 28 of the chucking pin 27. The positioning section 12d faces the flange 28 of the chucking pin 27 when the leader block 12 engages with the chucking member 25. Consequently, a position of the leader block 12 is determined when the chucking member 25 is chucked, thereby preventing the leader block from rotating and rattling during being carried.

The leader block 12 comprises positioning grooves 12f and 12g, which are formed at both ends of the bottom surface thereof for allowing the positioning thereof while engaged with the cartridge unit 401 or the drive apparatus 1. The positioning grooves 12f and 12g allow the positioning of the leader block 12 within the cartridge 4 and drive apparatus 1 by guiding the leader block 12 to the positioning protrusion provided within the cartridge unit 401 and drive apparatus 1. The positioning groove 12f, which is formed at the rear end of the bottom surface of the leader block 12, comprises a depressed groove in an approximately rectangular shape, running from the approximate center of the rear surface of the leader block 12 to the proximity of the bottom side engaging step 12c on the bottom surface of the leader block 12. The positioning groove 12f opens wider in a funnel shape at the opening thereof formed on the rear surface, while the tip end thereof is formed into a sharp point. The positioning groove 12g, which is formed at the front end of the bottom surface of the leader block 12, comprises a depressed groove in an approximately rectangular shape, running from the approximate center of the front surface of the leader block 12 to the proximity of the bottom side engaging step 12c on the bottom surface of the leader block 12. The positioning groove 12g also opens wider in a funnel shape at the opening thereof formed on the rear surface, while the tip end thereof is formed into a sharp point, as in the foregoing positioning groove 12f. Consequently, the positioning grooves 12f and 12g are easily guided to the positioning protrusion through the widened opening end, and by letting the sharply shaped positioning protrusions butt against the sharply formed tip section, thereby the position of the leader block 12 being determined reliably.

The leader block 12 further comprises engaging depressions 12h and 12i formed on the top surface thereof, as shown in FIG. 8, for positioning thereof when engaged with the cartridge 4 or the drive apparatus 1. The engaging depression 12h, formed at the rear end section of the leader block 12, engages with the protrusion 416, provided on the top surface side of the tape extraction hole 415 of the cartridge 4, shown in FIG. 17, when the leader block 12 is engaged with the cartridge unit 401. This enables the positioning of the leader block 12 within the cartridge 4 and prevents rattling thereof. After the leader block 12 is set in the drive apparatus 1, the engaging depression 12i, which is formed at the front end of the leader block 12, is engaged with an engaging protrusion (not shown in the figure) provided on the takeup reel 3 inside the drive apparatus 1. This enables the positioning of the leader block 12 within the drive apparatus 1 and prevents rattling thereof.

Figure 21:
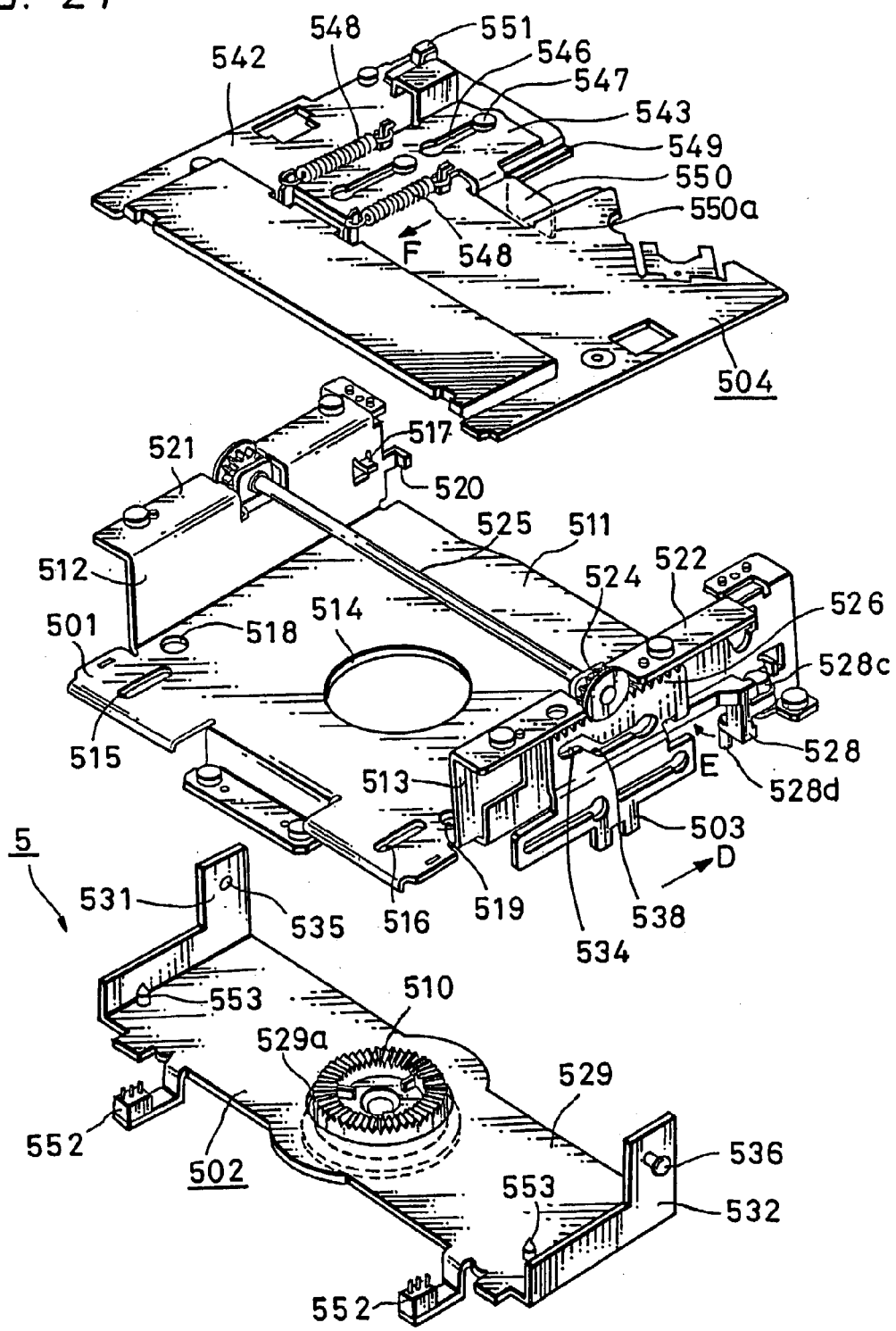
FIG. 21 is an exploded perspective view of a cartridge mount mechanism.
Figure 22:
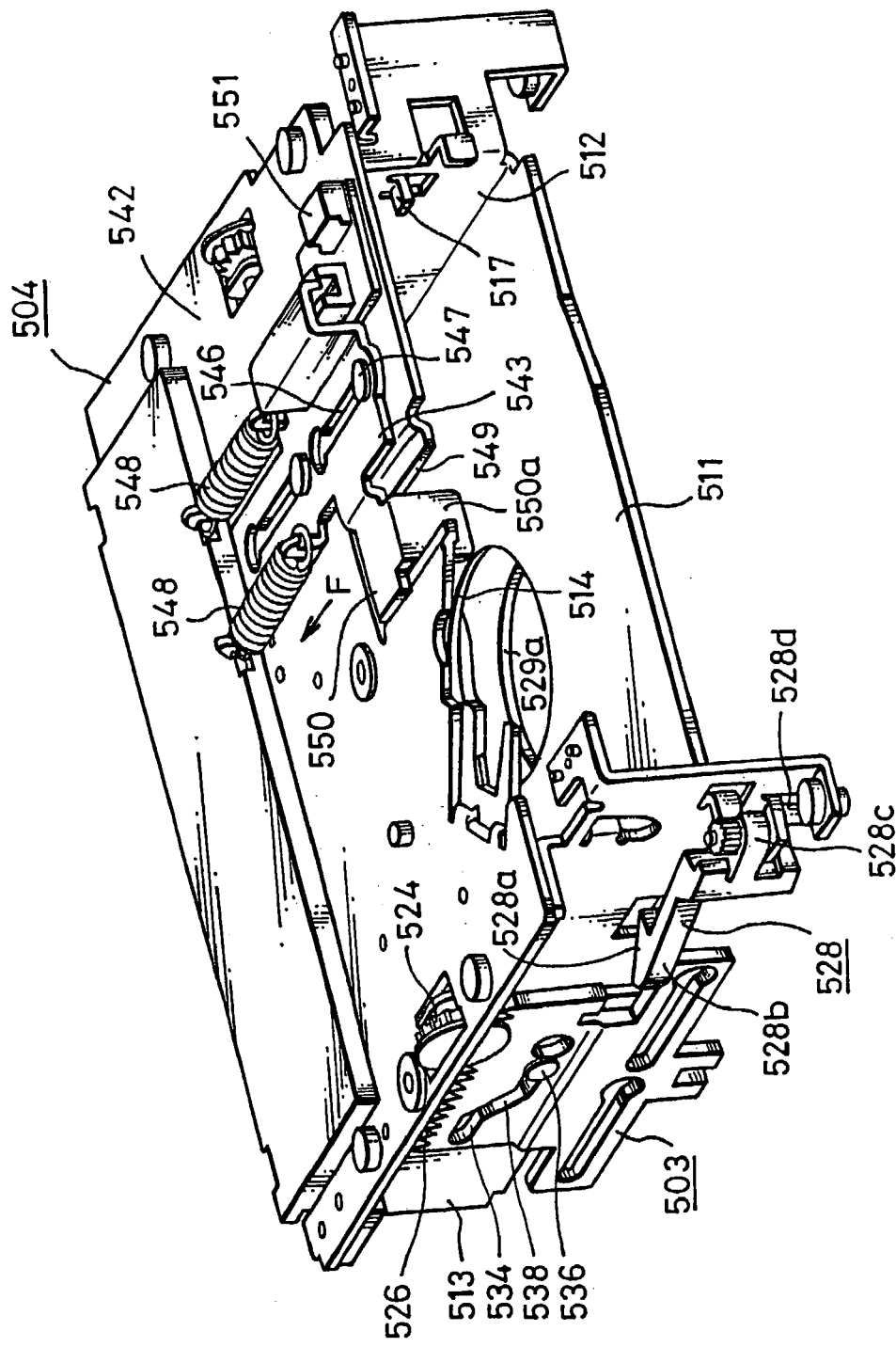
FIG. 22 is a perspective rear view of the cartridge mount mechanism.
Figure 23:
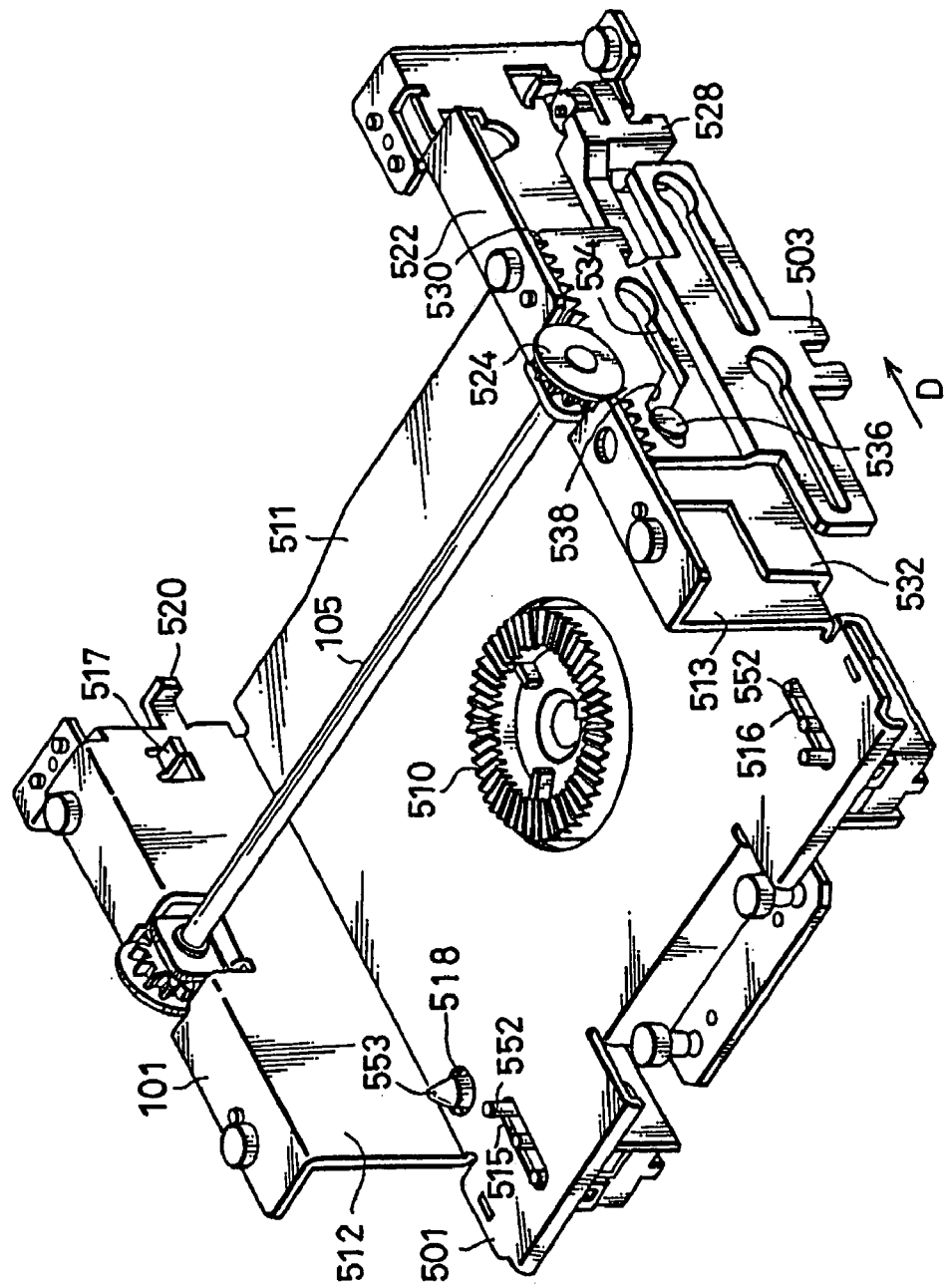
FIG. 23 is a perspective view showing a plate with a reel drive restriction plate that is drawn close by the sliding of the slide plate.

The cartridge mount mechanism 5, into which the tape cartridge 4 constituted as heretofore described is mounted, and which loads and unloads the tape cartridge 4, is disposed on the base chassis 1a of the tape drive apparatus 1, as shown in FIGS. 1 and 2, and as shown in FIGS. 21 through 23, the cartridge mount mechanism 5 comprises: a flame 501 on which the tape cartridge 4 inserted through the cartridge insertion slot into the tape drive apparatus 1, is mounted; a reel drive restriction plate 502, which restricts the vertical movement of a reel drive 510, to which the tape reel 410 of the tape cartridge 4, mounted on the flame 501, is rotatably engaged; a slide plate 503, which keeps the reel drive restriction plate 502 and a tape reel 410 at a close distance from each other; and a top plate 504, which is disposed at the top of the flame 501 and inserts and removes the tape cartridge 4.

The flame 501, on which the tape cartridge 4 is mounted, is constructed of a metal plate bent into an approximate letter C shape, and comprises a bottom plate 511 which constitutes the cartridge mounting section; and side plates 512 and 513 which are formed rising on the right and left ends of the bottom plate 511. The bottom plate 511 comprises an opening 514 formed on approximately center thereof, which corresponds to the reel drive section insertion hole 419 formed on the bottom surface of the cartridge 401, through which the reel drive 510, the height thereof being restricted by the reel drive restriction plate 502 (to be described later), is inserted. The bottom plate 511 further comprises insertion holes 515 and 516, through which an identification protrusion 552, provided on the reel drive restriction plate 502 for identifying the category or the like of the tape cartridge 4, is inserted; and positioning holes 518 and 519 formed thereon, through which positioning protrusions 553, provided on the reel drive restriction plate 502, is inserted to determine the position of the cartridge unit 401.

The side plates 512 and 513, formed rising up on the right and left side of the bottom plate 511, are formed as approximately high as the cartridge unit 401, and comprise stopper pieces 520 formed at the end thereof that opposes to the insertion slot for the tape cartridge 4, to stop the side surface 402a of the cartridge unit 401.

The side plates 512 and 513 comprise bent sections 521 and 522, which are in approximate letter L shape, formed in the longitudinal direction. Pinions 524 for moving the slide plate 503 (to be described later), is disposed on the bent sections 521 and 522 of the side plates 512 and 513 respectively at an approximate center of each side in the longitudinal direction. The pinions 524 are attached to both ends of a rotation shaft 525 that spans the side plates 512 and 513. The Pinion 524 meshes with a rack gear 530, formed on the slide plate 503, and as the rotation shaft 525 is rotated, moves the slide plate 503 in the direction of, or opposite direction to arrow D, shown in FIG. 21.

The side plate 512 further comprises the reel-lock release member 517 formed thereon at the position which corresponds to the reel-lock release member entry groove 408, which is formed along the side surface 402a of the insertion end and one side surface 402b, of the cartridge unit 401, as shown in FIG. 22. The insertion of the tape cartridge 4 into the flame 501 of the cartridge mount mechanism 5 causes the reel-lock release member 517 to enter the reel-lock release member entry groove 408 of the cartridge unit 401 and to come into contact with the first press section 412b of the shutter member 412. This causes the reel-lock release member 517 to press the shutter member 412 in the opposite direction to arrow A, shown in FIG. 15, and force the reel lock 411 to rotate in the direction of arrow B, shown in FIG. 15, as the cartridge unit 401 proceeds into the flame 501. Consequently, mounting of the tape cartridge 4 on the flame 501 releases the lock on the reel lock 411, thereby freeing the tape reel 410 to rotate.

The side plate 513 comprises a cartridge locking member 528 disposed thereon, which holds the tape cartridge 4 within the cartridge mount mechanism 5. The cartridge locking member 528 comprises: an approximately hook shaped engaging section 528a, with an inclined surface formed on the end into which the tape cartridge 4 is inserted; a lock arm 528b that turns the engaging section 528a between the inside and outside of the flame 501; a support protrusion 528c which supports the lock arm 528b being able to turn; and a turning pin 528d extending downward out of the lock arm 528b, which turns the lock arm 528b. The lock arm 528b is always forced by a twisted coil spring disposed on the support protrusion 528c to turn in the direction of arrow E, shown in FIG. 20, to turn the engaging section 528a into the flame 501. As the tape cartridge 4 is inserted into the cartridge mount mechanism 5, a side of the tape cartridge 4 pushes the engaging section 528a of the cartridge locking member 528 out of the flame 501. As soon as the tape cartridge 4 is mounted in the predetermined position on the plate, the engaging section 528a engages with a engaging depression formed on the side of the tape cartridge 4. This causes the approximately hook-shaped engaging section 528a of the cartridge locking member 528 to engage with the engaging depression on the tape cartridge 4, thereby holding the tape cartridge 4 inside the cartridge mount mechanism 5. When the tape cartridge 4 is ejected out of the cartridge mount mechanism 5, the turning pin 528d of the cartridge locking member 528 is pushed by a turning member (not shown), provided within the drive apparatus 1; the lock arm 528b is turned in the opposite direction to arrow E, shown in FIG. 21, against the force exerted by the twisted coil spring; and the engaging section 528a is ejected out of the engaging depression of the tape cartridge 4. Consequently, the tape cartridge 4, mounted on the cartridge mount mechanism 5, is able to be ejected out of the cartridge mount mechanism 5.

The reel drive restriction plate 502, which is disposed on the bottom side of the flame 501, and restricts the height of the reel drive 510 that engages with the tape cartridge 4, is constituted with a metal plate, or the like, bent into an approximate channel shape, as shown in FIG. 21. The reel drive restriction plate 502 comprises an opening 529a which is formed at an approximate center of a main surface 529 thereof, and through which the reel drive 510 protrudes for engaging with the engaging section 430 that is disposed on the base chassis la and formed on the bottom side of the tape reel 410. Side surface sections 531 and 532, formed as risen on the right and left on the main surface 529, comprise slide protrusions 535 and 536 which are inserted in a slide groove 534 formed on the slide plate 503. The reel drive restriction plate 502 is disposed to externally sandwich the side plates 512 and 513, as shown in FIG. 23, and also to face the reel drive 510 out of the opening 514 of the flame 501.

The reel drive 510, which meshes with the engaging section 430 formed on the bottom side of the tape reel 410, is constituted with a cylinder of an approximately equal diameter as a reel hub 424 of the tape reel 410, and comprises a plurality of protrusions and depressions that are capable of meshing with the engaging section 430. The reel drive 510 is disposed on the base chassis 1a and protrudes out of the opening 529a of the reel drive restriction plate 502. The reel drive 510 is forced upward for engaging with the engaging section 430 of the tape reel 410; engaged with the main surface 529 of the reel drive restriction plate 502; and the height of protrusion thereof over the bottom plate 511 of the flame 501 is restricted. The reel drive 510 is rotationally driven by a drive motor (to be described later) and rotates the tape reel 410, which is meshed with the reel drive 510.

The slide protrusions 535 and 536, formed on the side surfaces 531 and 532, is inserted through the slide groove 534, formed on the slide plate 503 and slides along the inclined surface of the slide groove 534 to position the reel drive restriction plate 502 close to, or distant from the flame 501. Consequently, the reel drive restriction plate 502 restricts the height of the reel drive 510 to the height of the tape reel 410, and causes the reel drive 510 to mesh with, or release from the reel hub 424.

The slide plate 503, which positions the reel drive restriction plate 502 close to, or distant from the flame 501, comprises: the slide groove 534, through which the slide protrusions 535 and 536 of the reel drive restriction plate 502 pass through; and a rack gear 526 which meshes with the pinions 524 disposed on both of the side plates 512 and 513. The slide plate 503 is disposed on the outside of the side plates 531 and 532 of the reel drive restriction plate 502.

The slide groove 534, through which the slide protrusions 535 and 536 of the reel drive restriction plate 502 pass, is formed in the longitudinal direction of the side surface sections 531 and 532 of the reel drive restriction plate 502; and comprises an inclined surface 538 formed thereon, that is inclined upward toward the end where the tape cartridge 4 is inserted. The protrusions 535 and 536 of the reel drive restriction plate 502 are inserted and move through the slide groove 534. The slide protrusions 535 and 536 that slide in the slide groove 534 climb up the inclined surface 538 of the slide groove 534 as the slide plate 503 slides in the direction of arrow D, shown in FIG. 23, bringing the reel drive restriction plate 502 closer to the frame. Consequently, the reel drive restriction plate 502 causes the reel drive 510, which is forced upward, to mesh with the reel hub 424 of the tape reel 410 mounted on the flame 501. At this time, since the reel drive restriction plate 502 is moved above the reel drive 510 which is now meshed with the reel hub 424, the reel drive 510 is rendered rotatable.

The rack gear 526, which meshes with the pinion 524 disposed on the flame 501, is formed on the top surface side of the slide plate 503. The rack gear 526 is driven by the pinion 524, moving the slide plate 503 in the direction of, or opposite direction to arrow D, shown in FIG. 21, so as to slide up and down the slide protrusions 535 and 536 that are inserted in the slide groove 534. Thus the reel drive restriction plate 502 is able to restrict the up-and-down movements of the reel drive 510.

The top plate 504, which is disposed on the top surface side of the flame 501, comprises: a top plate section 542 and a force plate 543, which is disposed on the top plate section 542 and forces the tape cartridge 4, mounted on the flame 501, in the direction of being ejected. The top plate 504 is screwed on the bent sections 521 and 522 that are formed on the side plates 512 and 513 of the flame 501.

The force plate 543, which ejects the tape cartridge 4 from the cartridge mount mechanism 5, comprises a guide groove 546 formed in the direction of inserting or ejecting the tape cartridge 4, where a guide 547, projecting out of the top plate section 542, is inserted. One end of a tensioning coil spring 548, which constitutes the forcing member that forces the force plate 543 toward the insertion end of the tape cartridge 4, is engaged with the force plate 543 near the guide groove 546. The tensioning coil spring 548, with the other end thereof engaged with the top plate section 542, normally forces the force plate 543 in the direction of ejecting the tape cartridge 4, which is the direction of arrow F shown in FIG. 21. Additionally, the force plate 543 comprises a moving guide 550 disposed, free to move, to be extended on a moving depression section 549 formed in an approximate channel shape on the top plate section 542, which guides the movement of the force plate 543. The moving guide 550 comprises a bumping plate 550a formed by bending thereof toward the flame 501 end, against which the end surface 402a on the insertion end of the cartridge unit 401 butts. The bumping plate 550a is normally forced in the direction of arrow F, shown in FIG. 21, for ejecting the tape cartridge 4 out of the cartridge mount mechanism 5 due to the force of the tensioning coil spring 548 acting on the force plate 543.

The insertion of the tape cartridge 4 into the flame 501 causes the side surface 402a of the insertion end of the cartridge unit 401 to apply pressure to the bumping plate 550a, thereby causing the moving guide 550 of the force plate 543 to move the depression section 549 of the top plate section 542 in the opposite direction to arrow F, shown in FIG. 21. Consequently, the force plate 543 moves along the guide groove 546, in the opposite direction to arrow F, shown in FIG. 21, against the force of the tensioning coil spring 548. The force plate 543 is forced and held in the opposite direction to arrow F, shown in FIG. 21, as the tape cartridge 4 is held in the flame 501 by the cartridge locking member 528 of the flame 501. A mounting sensor 551, disposed on the top plate section 542, detects the completion of mounting of the tape cartridge 4 on the flame 501 as the force plate 543 is forced in the opposite direction to arrow F.

As the locking of the cartridge unit 401 by the cartridge locking member 528 is released, the force of the tension coil spring 548 of the force plate 543 causes the bumping plate to force the cartridge unit 401 toward the insertion slot end of the tape drive apparatus 1, thereby ejecting the tape cartridge 4 out of the cartridge mount mechanism 5.

In the cartridge mount mechanism 5, as constituted in the foregoing manner, prior to the insertion of the tape cartridge 4 into the flame 501, the slide protrusions 535 and 536 of the reel drive restriction plate 502 are positioned at the bottom end of the slide groove 534 of the slide plate 503, and the reel drive 510 is retracted below the opening 514 of the flame 501 by the main surface 529 of the reel drive restriction plate 502. The engaging section 528a of the cartridge lock member 528, formed on the side plate 513 of the flame 501, is forced to turn into the interior of the flame 501.

Subsequently, in the cartridge mount mechanism 5, when the tape cartridge 4 is inserted into the flame 501, the bumping plate 550a is pressed by the side surface 402a of the insertion end of the tape the cartridge unit 401, causing the force plate 543 forced in the direction of ejecting the tape cartridge 4 against the force of the tension coil spring 548 to move in the opposite direction to arrow F, shown in FIG. 21. This enables the mounting sensor 551 provided on the top plate section 542 of the top plate 501 to detect the mounting of the tape cartridge 4 into the flame 501. At this moment, the inclined surface of the engaging section 528a of the cartridge locking member 528, provided on the side plate 513 of the flame 501, is pressed against the side surface of the cartridge unit 401 and forced to turn in the opposite direction to arrow E, shown in FIG. 21. When the tape cartridge 4 is finally mounted in the predetermined position on the flame 501, the engaging section 528a engages with the engaging depression formed on the side surface of the cartridge unit 401, thereby holding the tape cartridge 4 within the cartridge mount mechanism 5.

At this moment, the reel-lock release member 517 enters the reel-lock release member entry groove 408 in the tape cartridge 4, and presses the reel lock 411 through the shutter 412, thereby unlocking the tape reel 410.

When the mounting sensor 551 detects the mounting of the tape cartridge 4, a motor (to be described later) drives the rotation shaft 525 that spans between the side plates 512 and 513 of the flame 501, and the slide plate 503 moves in the direction of arrow D, shown in FIGS. 21 and 23. As this occurs, the slide protrusions 535 and 536 of the reel drive restriction plate 502, being inserted into the slide groove 534 of the slide plate 503 as shown in FIG. 23, climb up the inclined surface 538 of the slide groove 534; and the reel drive restriction plate 502 moves close to the flame 501. This causes the reel drive 510, having been retracted out of the flame 501 by the main surface 529 of the reel drive restriction plate 502, to protrude out of the opening 514 in the flame 501 and mashes with the reel hub of the tape reel 410. The identification protrusion 552, which is disposed on the reel drive restriction plate 502 for identifying the category and the like of the tape cartridge, and the positioning protrusion 553, which is for the positioning of the cartridge unit 401, protrude out of the insertion holes 515 and 516 and the positioning holes 518 and 519, respectively, and enter detection holes and positioning holes (not shown) that are provided on the bottom surface of the cartridge unit 401.

When the cartridge 4 is ejected out of the cartridge mount mechanism 5, a motor drives the rotation shaft 525, moving the slide plate 503 in the opposite direction to arrow D, shown in FIGS. 21 and 23. Subsequently, the slide protrusions 535 and 536 of the reel drive restriction plate 502 inserted through the slide groove 534 of the slide plate 503, move down on the inclined surface 538; and the reel drive restriction plate 502 moves away from the flame 501. This causes the reel drive 510, on which the main surface 529 of the reel drive restriction plate 502 is pressed, to be unmeshed from the reel hub 424 of the tape reel 410. Additionally, the identification protrusions 552 and positioning protrusions 553, disposed on the reel drive restriction plate 502 are retracted from the insertion holes 515 and 516 and positioning holes 518 and 519 of the flame 501, respectively, and from the cartridge unit 401. Furthermore a turning member (not shown) pushes the turning pin 528d of the cartridge locking member 528; turns the turning pin 528d of the lock arm 528b in the opposite direction to arrow E, shown in FIG. 21, against the force of the twisted coil spring; and ejects the engaging section 528a out of the engaging depression on the tape cartridge 4. This allows the force of the tension coil spring 548 engaged with the force plate 543 to press the tape cartridge 4 mounted on the flame 501, against the bumping plate 550a, thereby ejecting cartridge 4 out of the cartridge mount mechanism 5.

The ejection of the tape cartridge 4 out of the cartridge mount mechanism 5 causes reel lock release mechanism 517 to retract from the reel lock unlocking member entry groove 408, the reel lock 411 meshes with the tape reel 410, thereby restricting the free movement of the tape reel 410. Additionally, the press shaft of the reel lock 411 of the tape cartridge 4 presses on, and moves the shutter 412 of the tape cartridge 4 in the direction of arrow A, shown in FIG. 15, thereby closing the shutter hole 408a in the reel-lock release member entry groove 408, and preventing the cartridge unit 401 from being entered by dust and others, while not in use.

The workings of the drive apparatus 1 will be described as follows. Upon the insertion of the tape cartridge 4 into the cartridge mount mechanism 5, the cartridge 401 is mounted within the frame 501, as the cartridge 401 presses the bumper plate 550a of the force plate 543, which is provided on the top plate 504. The displacement of the force plate 543 in the opposite direction to arrow F, shown in FIG. 22, enables the mounting sensor 551, disposed on the top plate section 542, to detect the tape cartridge 4 having been mounted within the flame 501. At this time, the cartridge locking member 528, disposed on the side wall 513 of the flame 501, engages with the engaging depression on the cartridge unit 401, thereby holding the cartridge unit 401 within the flame 501. Additionally, the reel-lock release member 517, formed on the side wall 513 of the flame 501, enters the reel-lock release member entry groove 408, formed on the cartridge unit 401, to press on the shutter 412, which has kept the cartridge unit 401 closed, thereby turning the reel lock 411 to unlock the tape reel 410 in the direction of arrow B, in FIG. 15.

When the mounting sensor 511 detects the tape cartridge 4 mounted, the rotation shaft 525, spanning across the flame 501, is rotationally driven by the drive mechanism, and the slide plate 503 moves in the direction of arrow D, shown in FIG. 21. This causes the slide protrusions 535 and 536 of the reel drive restriction plate 502 to climb up along the slide groove 534 of the slide plate 503 and to move close to the flame 501. The movement of the reel drive restriction plate 502 being close to the flame 501 causes the reel drive 510 to mesh with the tape reel 410, and also causes the identification protrusions 552 and positioning protrusions 553 of the reel drive restriction plate 502 to be inserted into the cartridge 401.

When the chucking member 25 is inserted into the engaging section 12a of the leader block 12, the motor $M_L$ starts moving the carrying section 13 of the carrying mechanism 11 to the takeup reel 3 end. At this point, the force pressing the chucking member 25 toward the press section 29a is relieved; the chucking pin 27 springs back upward, as shown in FIG. 7; and the flange 28 engages with the leader block 12, as the flange 28 is inserted into the positioning step 12d of the leader block 12, and the notch 28a formed on the flange 28, is butted against the rotation restriction section 12e.

In the process of carrying the carrying section 13 of the carrying mechanism 11 to the takeup reel 3 end, an unintended depression of the press section 29a that would result in releasing the engagement of the leader block 12 with the chucking member 25 is prevented, since the unlocking prevention plate 27a, formed on the press section 29a of the chucking member 25, extends over the guide section 17a, protruding along the guide groove 15a of the base plate 15. Because notch 28a formed on the engaging flange 28 of the chucking pin 27 butts against the rotation restriction section 12e of the leader block 12, positioning of the leader block 12 is executed to prevent the free movement thereof.

When the carrying section 13 is moved to the takeup reel 3 and the leader block 12 is inserted into the reel center through the insertion hole, the chucking release lever 34 releases the engagement of the chucking member 25 with the leader block 12.

Subsequently, the magnetic tape T, disposed between the tape cartridge 4 and the takeup reel 3, is guided by the loading pins 6a and 6b provided on both sides of the drum 2 of the rotating magnetic head apparatus, and is brought to slide around the drum 2 of the rotating magnetic head apparatus in an approximate configuration of a letter M.

Likewise on rewinding the magnetic tape T, the magnetic tape T is rewound into the cartridge 401, as the leader block 12 is engaged with the chucking member 25 and the carrying section 13 of carrying mechanism 11 is moved. Here, when the leader block 12 is stored into the cartridge unit 401, the positioning protrusion and engaging protrusion 416 formed in the cartridge unit 401, engage with the positioning groove 12f and engaging depression 12h formed on the leader block 12, respectively, to effect the positioning of the leader block 12 within the cartridge unit 401 and prevent rattling.

When the tape cartridge 4 is ejected out of drive apparatus 1, the rotation shaft 525, spanning across the side plates 512 and 513 of the flame 501, is rotationally driven by a motor (not shown), and the slide plate 503 moves in the direction of arrow D, shown in FIGS. 21 and 23. This causes the slide protrusions 535 and 536 of the reel drive restriction plate 502, inserted in the slide groove 534, to slide down the inclined surface 538 of the slide groove 534, causing the reel drive restriction plate 502 to move away from the flame 501, and the reel drive 510, protruding out of the main surface 529 of the reel drive restriction plate 502, to retract from the tape reel 401. The identification protrusions 552 and positioning protrusions 553 also retract from the interior of the cartridge unit 401.

Subsequently, as the turning pin 528d of the cartridge locking member 528 is pushed by a turning member (not shown), the lock arm 528b is turned against the force of the twisted coil spring in the direction opposite to arrow E, shown in FIG. 21, and the engaging section 528a is ejected from the engaging depression of the tape cartridge 4. Consequently, the tape cartridge 4 mounted in the flame 501, is pushed against the bumping plate 550a by the force of the tension coil spring 548, which is engaged with the force plate 543, and is ejected out of the cartridge mount mechanism 5.

The ejection of the tape cartridge 4 out of the cartridge mount mechanism 5 causes-the reel-lock release member 517 to retract from the reel-lock release member entry groove 408, thereby the shutter 412 of the tape cartridge 4 closing the shutter hole 408a and preventing dust and others from entering into the cartridge unit 401, and simultaneously, preventing the free movement of the tape reel 410 with the reel lock 411 being engaged, while not in use.

Figure 24:
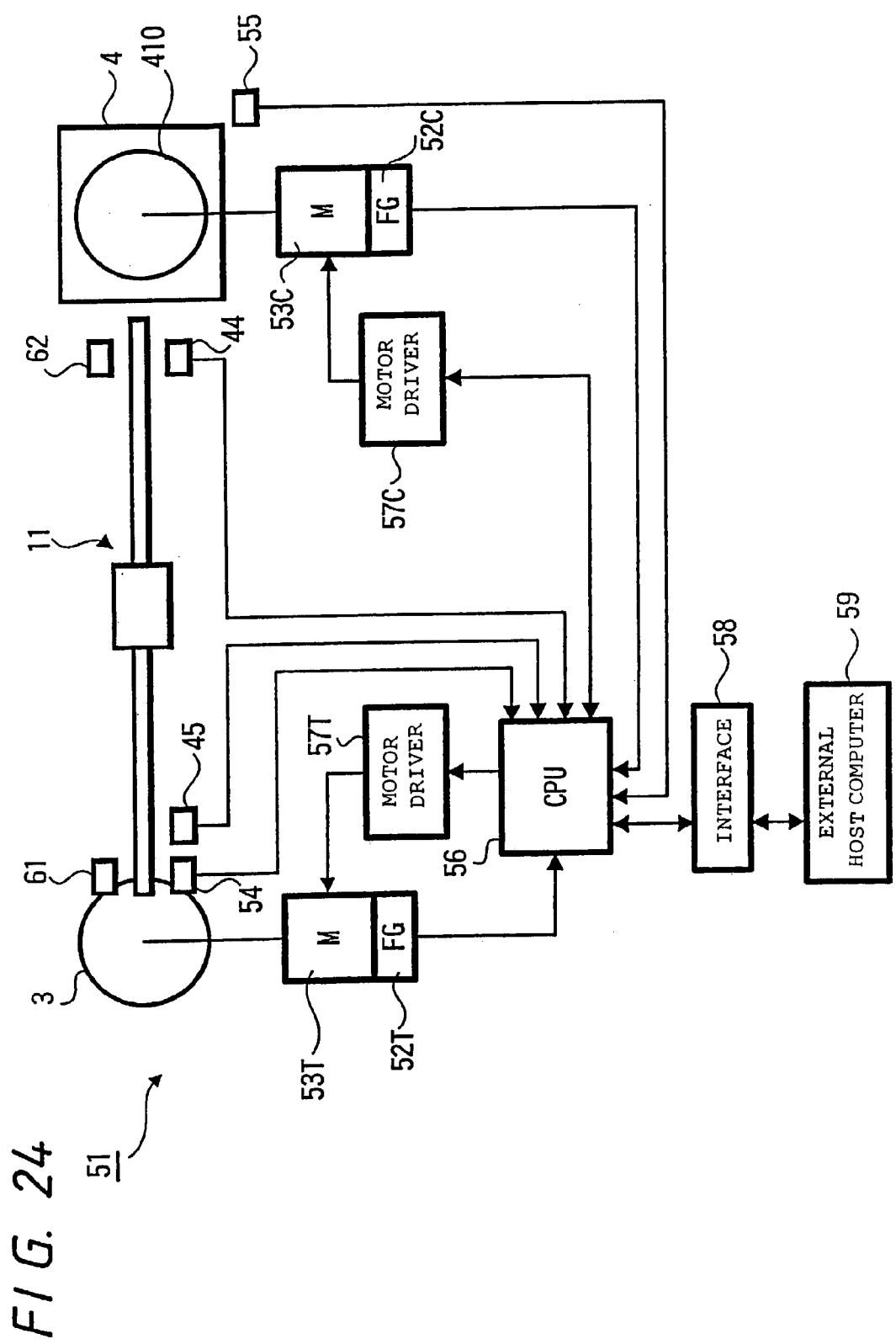
FIG. 24 is a diagram showing a drive circuit for the tape drive apparatus shown in FIG. 1.

In the tape drive apparatus 1, constituted as heretofore described, the takeup reel 3, the reel of the tape cartridge 4 mounted in the cartridge mount mechanism 5, and tape the carrying mechanism 11 are controlled and driven by a drive circuit 51, as shown in FIG. 24

Specifically, the takeup reel 3 and the tape reel 410 of the tape cartridge 4 are driven by reel motors 53T and 53C that comprise frequency generators (FG) 52T and 52C, respectively. The takeup reel 3 end comprises a reel angle detecting sensor 54, while the cartridge mount mechanism 5 end comprises a cartridge in-out detecting sensor (eject sensor) 55, from which respective output signals thereof are input to a central processing unit (CPU) 56 along with the output signals from the above described position sensors 44 and 45. The CPU 56 also receives the output signals of FG 52 T and 52C. Motor drivers 57T and 57C for the reel motors 53T and 53C, respectively, are connected to the CPU 56, and the CPU 56 is connected to an external host computer 59 acting as a display means through an interface 58. The tape carrying mechanism 11 comprises chucking sensors 61 and 62 on the takeup reel 3 end and the cartridge mount section 5 end respectively.

Figure 25:
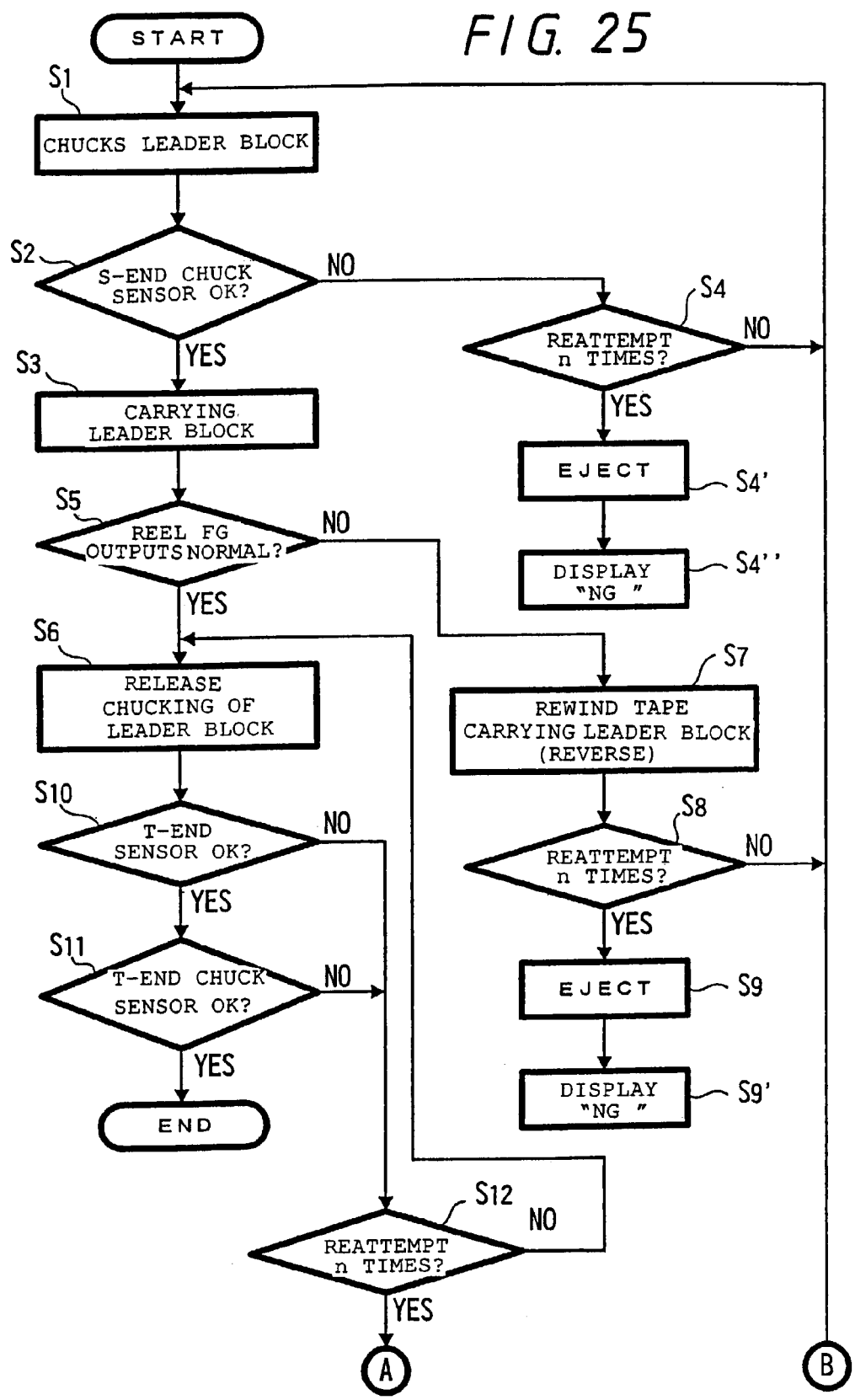
FIG. 25 is a flow chart explaining the loading action of the tape drive apparatus shown in FIG. 1.
Figure 26:
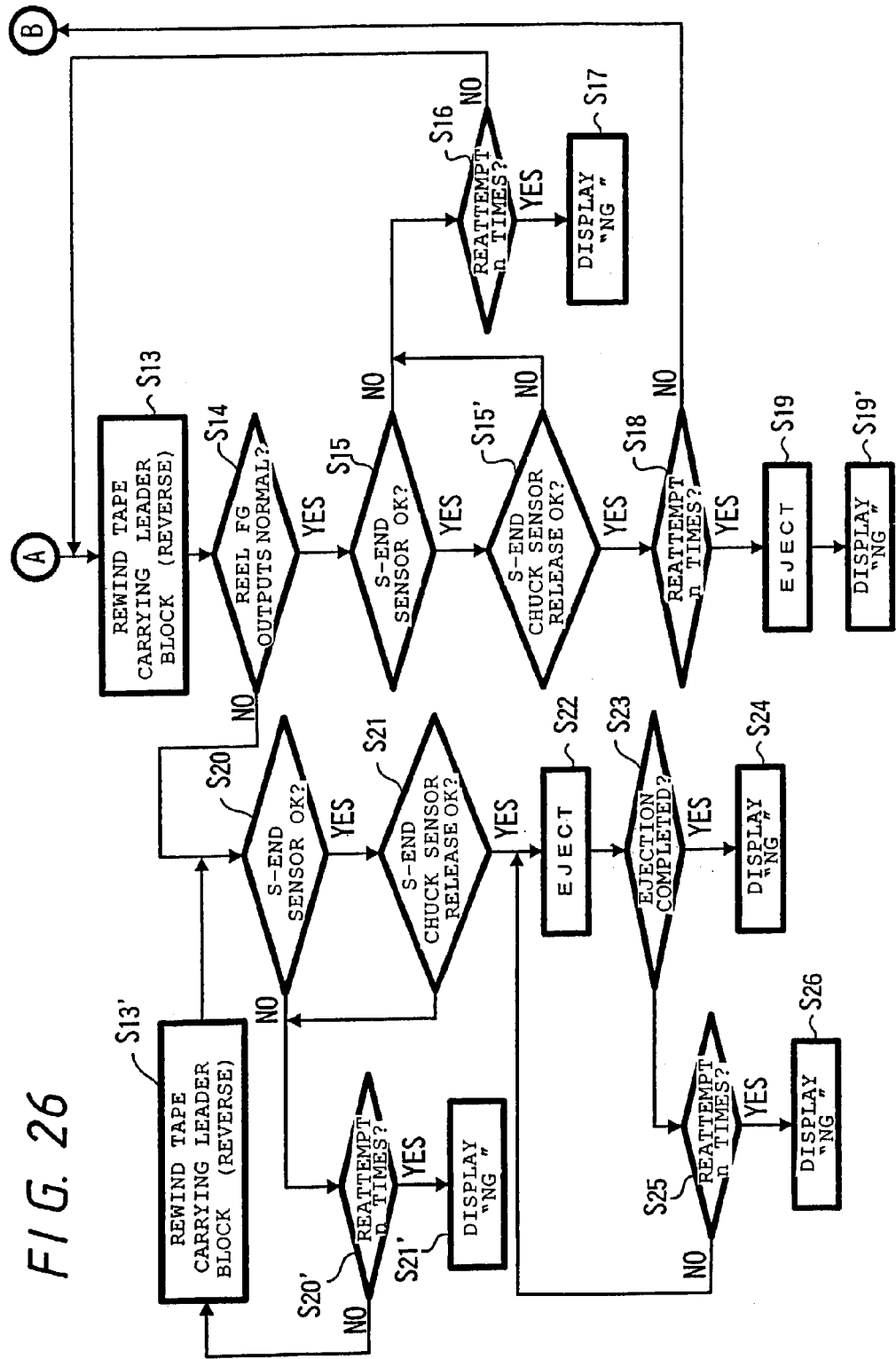
FIG. 26 is a flow chart showing a continuation of the flow chart shown in FIG. 25.
Figure 27:
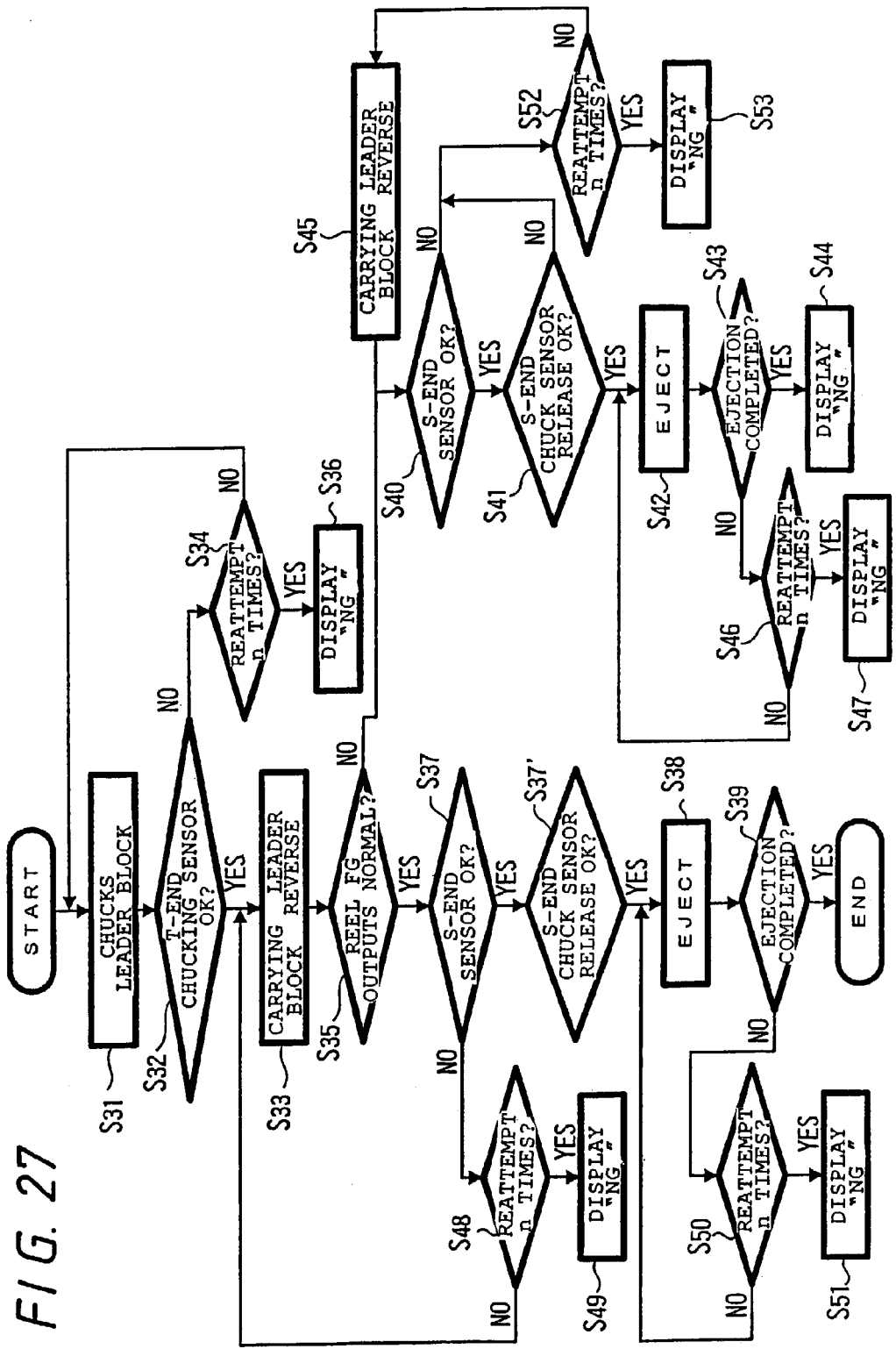
FIG. 27 is a flow chart explaining the unloading action of the tape drive apparatus shown in FIG. 1.

With reference to FIGS. 25 through 27, control action of the tape drive apparatus 1 that is constituted as described above will be explained. First, the workings of a tape loading process will be explained with reference to FIGS. 25 and 26.

The tape loading process starts upon the mounting of the cartridge 4 on the cartridge mount section. As shown in FIGS. 4, 6, 8, 9 and others, the bottom half section of the chucking pin 27, which is pushed down by the external cylinder 26 of the chucking member 25 and chucking release lever 33 in the chucking mechanism 14, is inserted into the engaging section 12a of the leader block 12, which is attached to the end of the tape T, from the side opening of the engaging section 12a. As shown in FIG. 6, the chucking pin 27 is forced upward as the downward force thereon is relieved, and the engaging flange 28 is then engaged with the positioning step 12d of the bottom side engaging step 12c, and the leader block 12 is chucked (step $S_1$). The chucked status is detected by the chuck sensor 62 (step $S_2$), and when the chucked status is "Yes", the reel lock 12 is carried (step $S_3$). When the chucking pin 27 is in the status of chucking the leader block 12, the notch 28a of the engaging flange 28 engages with the flat surface 12e of the positioning step 12d to prevent any unwanted rotation. If the chucked status is a "No", the aforementioned action is attempted n number of times (step $S_4$), whereupon ejection occurs (step $S_4'$) and "NG" is displayed ($S_4''$).

The leader block 12 is carried by the tape carrying mechanism 11 along the cam groove 19 of the guide rail 23. During this process, the output of the FG 52C is checked to detect whether the rotation of the tape reel 410 of the tape cartridge 4 is normally conducted or not (detection of reversed or stopped reel rotation) (step $S_5$). When the rotation is normally conducted, the leader block 12 is continuously carried until reaching the takeup reel 3 end (Step $S_6$). If the rotation of the tape reel 410 of the tape cartridge 4 is not normal, tape is deliberately wound back as the carrying mechanism 11 and the carrying section 13 are reversed (step $S_7$). The winding back process is repeatedly attempted n number of times while the reel FG output is monitored (step $S_8$). After the termination of trials, ejected (step $S_9$) and "NG" is displayed (step $S_9'$)

When the leader block 12 is carried to the takeup reel 3 end, the top the press section 29a of the support 29, on the chucking pin 27 in the chucking mechanism 14, meets the bottom side of the press surface 34a on the chucking release lever 34 on the takeup reel 3 end, that is, in a manner symmetrical to the situation shown in FIG. 7; is pushed downward by the downward move of the chucking release lever 34; and the chucking of the leader block 12 is released (step $S_6$). Simultaneously, T-side sensor 45 of the takeup reel 3 end, detects the completion of carrying the leader block 12 (step $S_{10}$). The release is detected by the chucking sensor 61 of T-side, that is the takeup reel 3 end, thereby the process being terminated (step $S_{11}$).

If the chucking of the leader block 12 is not released, chucking release attempt is repeated n number of times (step $S_{12}$). If chucking release is unsuccessful, the leader block 12 is reversely carried by the carrying mechanism 11 (step $S_{13}$); the reel FG output is detected whether it is normal or not (step $S_{14}$), and if the reel FG output is normal, the carrying process is terminated and detected by the S-end sensor 44 as a terminated process (step $S_{15}$). If the carrying process is not terminated, the process is repeated n number of times (step $S_{16}$). If repeated attempts are still unsuccessful, "NG" is displayed (step $S_{17}$).

In step $S_{15}$, if the completed carrying process for the leader block 12 is detected by the S-end sensor 44, which is on the tape cartridge 4 end; the carrying section 13 of the carrying mechanism 11 is returned, and also which is detected by the chucking sensor 62 on the S-end sensor, which is the cartridge 4 end (Step $S_{15}$'); loading attempts are repeated (step $S_{18}$); but still the status is NG, ejection occurs (step $S_{19}$) and "NG" is displayed (step $S_{19}$').

In step $S_{14}$, if the reel FG output is other than normal, the carrying mechanism is reversely moved (step $S_{20}$) and chucking is released (step $S_{21}$), and upon completion thereof, the cartridge 4 is deliberately ejected (step $S_{22}$). If the reversed carrying mechanism operation to release the chucking cannot be completed, reversed carrying mechanism operation for the leader block is attempted n number of times (step $S_{20}$'), and carrying back the leader block 12 by the carrying mechanism 11 (Step $S_{13}$'). If repeated attempts are unsuccessful, "NG" is displayed (step $S_{21}$'). If an error occurs in returning the carrying mechanism at the termination of ejection (step $S_{23}$), "NG" is displayed (step $S_{24}$). If the ejection cannot be terminated in Step $S_{23}$, attempts are repeated n number of times (step $S_{25}$). If no attempts for ejection are yet successful, "NG" is displayed (step $S_{26}$)

An explanation of an unloading process follows with reference to FIG. 27.

The tape unloading process is the same as the tape loading process in the foregoing, but in reverse. The chucking release lever 34, pushing down the leader block 12, which is being carried to the takeup reel 3 end, is released by the same action of the chucking pin 27 of the chucking member 25 in the chucking mechanism 14, as shown in FIGS. 3 and 6. The chucking pin 27 is forced upward such that the engaging flange 28 engages with the positioning step 12d of the engaging section 12a of the leader block 12; to chuck the leader block 12 (step $S_{31}$). Here, the takeup reel 3 is positioned as required to allow the release of the engagement with the leader block 12 by means of the output signal of the reel angle detection sensor 54.

The chucked status of the leader block 12 is detected by the chuck sensor 61 (step $S_{32}$). If a chucked status "Yes" is returned, the leader block 12 is reversely carried by the carrying section 13 of the carrying mechanism 11 (step $S_{33}$). If a chucked status "No" is returned, the foregoing process is attempted n number of times (step $S_{34}$).

In reversely carrying the leader block 12 in step$_{33}$, the FG 52C output is used to determine whether the rotation of the reel 410 in the cartridge 4 is normal or not (step $S_{35}$). In step $S_{34}$, unsuccessful repeated attempts to chuck the leader block 12 results in "NG" display (step $S_{36}$).

After the S-end sensor 44 detects the completion of the reverse carrying of the leader block 12 (step $S_{37}$), and after the chuck sensor 62 detects the chucking release of the leader block 12 (step $S_{37}$'), the tape cartridge is ejected (step $S_{38}$). The completion of the ejection (step $S_{39}$) terminates the unloading process.

In step $S_{35}$, if the output of the FG 52C is other than normal, after the completion of reversed carrying mechanism operation (step $S_{40}$) and chucking release (step $S_{41}$), the cartridge 4 is deliberately ejected (step $S_{42}$) and on the completed ejection (step $S_{43}$), "NG" is displayed (step $S_{44}$). In step $S_{40}$ or $S_{41}$, if the reversed carrying mechanism operation or chucking release is not completed after repeated attempts for n number of times (step $S_{52}$), "NG" is displayed (step $S_{53}$).

In step $S_{43}$, if the ejection cannot be completed, and it is attempted n number of times (step $S_{46}$). If a repeated attempt is successful and ejection is completed, "NG" is displayed (Step $S_{47}$).

In step $S_{37}$', if the reversed carrying operation or chucking release cannot be completed, the reversed carrying is attempted n number of times (step $S_{48}$), and "NG" is displayed on a successful termination of reversed carrying (step $S_{49}$). If the ejection of the cartridge 4 is not terminated in step $S_{39}$, attempts are made n number of times (step $S_{50}$). If the ejection cannot be terminated by repeated attempts, "NG" is displayed (step $S_{51}$).

As described above, the magnetic tape T stored in the tape cartridge 4 is loaded and unloaded.

The embodiment of the present invention is heretofore described, however, the present invention is not limited to the configuration of the particular embodiment as described, but may be modified in various ways within the purport of the invention.

For instance, the members of configuration are not limited to those illustrated, but may be any configuration that would offer workings of the same kinds.

The present invention is not limited to the helically scanned tape drive apparatus, but may also be applied to the fixed-head tape drive apparatus.

| DESCRIPTION OF REFERENCE NUMERALS | |
| --- | --- |
| 1 | Tape drive apparatus |
| 3 | Takeup reel |
| 4 | Cartridge |
| 410 | Tape reel |
| 5 | Cartridge mount |
| 11 | Carrying mechanism |
| 12 | Leader block |
| 13 | Carrying section |
| 14 | Chucking mechanism |
| 19 | Cam groove |
| 27 | Chucking pin |
| 33, 34 | Chucking release levers |
| 35, 36 | Cams |
| 52C, 52T | Frequency generators |
| 53C, 53T | Reel motors |
| T | Magnetic tape |

What is claimed is:

1. A tape drive apparatus for recording and/or reproducing information on a magnetic tape extracted from a tape cartridge, comprising: a carrying mechanism for extracting said magnetic tape as a recording medium, from said cartridge where the magnetic tape is stored, and for carrying the magnetic tape to be wound up onto a takeup reel provided on the drive apparatus, characterized in that said carrying mechanism comprises:

a carrying section engaging with a leader block provided at the end of said magnetic tape, and carrying the leader block between said cartridge and said takeup reel; and a chucking mechanism for engaging, or releasing engagement with said leader block in conjunction with the movement of the carrying section, wherein the engagement and engagement releasing action of the chucking mechanism is effected by a pair of cams provided on the carrying section that alternately engage a pair of release levers provided on a cartridge mount end and a take up reel end of the tape drive apparatus in conjunction with the movement of said carrying section.

2. The tape driver apparatus according to claim 1, wherein said chucking mechanism of said carrying mechanism moves along a cam groove disposed between the cartridge mount end and the takeup reel end of the tape drive apparatus.

3. The tape drive apparatus according to claim 1, wherein said chucking mechanism comprises a chucking pin, which is normally forced in the direction of engaging the leader block, and which releases engagement by being pressed by one of the release levers disposed on the cartridge mount end and the takeup reel end of the tape drive apparatus.

* * * * *